(12) United States Patent
Sato et al.

(10) Patent No.: US 6,850,390 B2
(45) Date of Patent: Feb. 1, 2005

(54) THIN-FILM MAGNETIC HEAD AND METHOD OF MANUFACTURING SAME

(75) Inventors: Yoshikazu Sato, Tokyo (JP); Yuichi Watabe, Tokyo (JP); Tetsuya Roppongi, Tokyo (JP)

(73) Assignee: TDK Corporation, Tokyo (JP)

(*) Notice: Subject to any disclaimer, the term of this patent is extended or adjusted under 35 U.S.C. 154(b) by 20 days.

(21) Appl. No.: 09/985,611

(22) Filed: Nov. 5, 2001

(65) Prior Publication Data

US 2003/0151851 A1 Aug. 14, 2003

(30) Foreign Application Priority Data

Nov. 10, 2000 (JP) ........................................ 2000-343245

(51) Int. Cl.⁷ ............................ G11B 5/147; G11B 5/23
(52) U.S. Cl. ...................................... 360/126; 360/119
(58) Field of Search .................................. 360/126, 119

(56) References Cited

U.S. PATENT DOCUMENTS

| | | | |
|---|---|---|---|
| 4,791,719 A | 12/1988 | Kobayashi et al. | |
| 4,855,854 A | 8/1989 | Wada et al. | |
| 4,873,599 A | 10/1989 | Sueoka | |
| 5,325,254 A | * 6/1994 | Cooperrider | ................ 360/126 |
| 5,473,491 A | * 12/1995 | Fujisawa et al. | ............ 360/126 |
| 6,330,127 B1 | * 12/2001 | Sasaki | ......................... 360/126 |
| 6,621,659 B1 | * 9/2003 | Shukh et al. | ................ 360/126 |
| 6,624,970 B1 | * 9/2003 | Sasaki | ......................... 360/126 |

FOREIGN PATENT DOCUMENTS

| | | |
|---|---|---|
| JP | A 60-133516 | 7/1985 |
| JP | A 62-114113 | 5/1987 |
| JP | A 63-195815 | 8/1988 |
| JP | A 63-292405 | 11/1988 |
| JP | A 08-007222 | 1/1996 |
| JP | 11-102506 A | 4/1999 |
| JP | 2000-57522 A | 2/2000 |
| JP | 2000-67413 A | 3/2000 |

* cited by examiner

Primary Examiner—David Davis
(74) Attorney, Agent, or Firm—Oliff & Berridge, PLC

(57) ABSTRACT

A thin-film magnetic head comprises first and second magnetic layers; a gap layer provided between the first and second magnetic layers; a coupling portion for magnetically coupling the first magnetic layer and the second magnetic layer to each other at a distance from the medium facing surface ABS; and a thin-film coil at least part of which is disposed between the first and second magnetic layers. The second magnetic layer has a pole portion layer and a yoke portion layer. The pole portion layer has a saturated magnetic flux density equal to or greater than that of the yoke portion layer. The yoke portion layer magnetically connects the upper end of the coupling portion and the rear end surface of the pole portion layer to each other.

22 Claims, 14 Drawing Sheets

THIN-FILM MAGNETIC HEAD AND METHOD OF MANUFACTURING SAME

BACKGROUND OF THE INVENTION

1. Field of the Invention

The present invention relates to a thin-film magnetic head for use with a magnetic read/write apparatus such as a magnetic disc apparatus and a magnetic tape apparatus, and to the method of manufacturing such a thin-film magnetic head.

2. Description of the Related Art

The recording schemes for a magnetic read/write apparatus include a longitudinal magnetic recording scheme which employs the direction of signal magnetization along the surface of the recording medium (or in the longitudinal direction) and a vertical magnetic recording scheme which employs the direction of signal magnetization perpendicular to the surface of the recording medium. When compared with the longitudinal magnetic recording scheme, the vertical magnetic recording scheme is said to be less affected by the thermal fluctuation of a recording medium and therefore possible to implement a higher linear recording density.

In general, the thin-film magnetic head that employs the longitudinal magnetic recording scheme comprises: a medium facing surface (or air bearing surface) that faces toward a recording medium; a first magnetic layer and a second magnetic layer magnetically coupled to each other and including magnetic pole portions that are opposed to each other and placed in regions of the magnetic layers on a side of the medium facing surface, with a gap layer provided between the pole portions; and a thin-film coil at least a part of which is placed between the first and second magnetic layers and insulated from the first and second magnetic layers.

On the other hand, examples of the thin-film magnetic head that employs the vertical magnetic recording scheme include a ring head having the same structure as that of the thin-film magnetic head that employs the longitudinal magnetic recording scheme, and a single magnetic pole head for applying a magnetic field in a direction perpendicular to the recording medium with one main magnetic pole. Generally, for the single magnetic pole head, used as a recording medium is a two-layer medium that has a soft magnetic layer and a magnetic recording layer stacked on a substrate.

For thin-film magnetic heads, it is desired that the track width should be reduced so as to increase track density. For the purpose of achieving reduction in the track width without reducing the intensity of a magnetic field to be applied to the recording medium, various thin-film magnetic heads have been proposed, in which the magnetic layer including the magnetic pole portion is divided into a magnetic pole portion and a yoke portion that is magnetically connected to the magnetic pole portion, the magnetic pole portion having a saturated magnetic flux density higher than that of the yoke portion.

Examples of the thin-film magnetic head having the structure in which the magnetic layer including the magnetic pole portion is divided into the magnetic pole portion and the yoke portion as mentioned above are disclosed in Published Unexamined Japanese Patent Application (KOKAI) Nos. 2000-57522, 2000-67413, and Heisei 11-102506.

Any one of the thin-film magnetic heads disclosed in the aforementioned publications comprises the first and second magnetic layers. The second magnetic layer is disposed on the leading side in the traveling direction of the recording medium (or on the air-outflow-end side of a slider including the thin-film magnetic head), and is divided into the magnetic pole portion and the yoke portion.

In addition, in any one of the thin-film magnetic heads disclosed in the aforementioned publications, the yoke portion is arranged so as to detour around a coil in a region extending from a portion where the first and second magnetic layers are magnetically connected to each other to the magnetic pole portion.

In the thin-film magnetic head disclosed in Published Unexamined Japanese Patent Application (KOKAI) No. 2000-57522, the second magnetic layer has a main magnetic film and an auxiliary magnetic film. In this head, the magnetic pole portion is composed of a part of the main magnetic film located on a side of the medium facing surface, while the yoke portion is composed of the other part of the main magnetic film and the auxiliary magnetic film.

In the thin-film magnetic head disclosed in Published Unexamined Japanese Patent Application (KOKAI) No. 2000-67413, the second magnetic layer has a pole portion layer including the magnetic pole portion, and a yoke portion layer including the yoke portion. The pole portion layer is magnetically connected to the yoke portion layer at the rear end surface (opposite to the medium facing surface), at the side surfaces (perpendicular to the medium facing surface and a surface of the gap portion), and at the top surface (opposite to the gap portion).

In the thin-film magnetic head disclosed in Published Unexamined Japanese Patent Application (KOKAI) No. Heisei 11-102506, the second magnetic layer has a pole portion layer including the magnetic pole portion, and a yoke portion layer including the yoke portion. The pole portion layer is magnetically connected to the yoke portion layer at the side surfaces and at the top surface.

On the other hand, for the thin-film magnetic head employing the vertical magnetic recording scheme, an example of the structure of a single magnetic pole head is shown in FIG. 2 of "Nikkei Electronics, Sep. 25, 2000 Issue (No. 779), p. 206". This head has a single-layered magnetic layer including the main magnetic pole.

For example, to realize a magnetic read/write apparatus having an areal recording density of 60 G bits/inch$^2$ or greater, the vertical magnetic recording scheme is expected to be employable. However, such a thin-film magnetic head has not been realized that is suitable for the vertical magnetic recording scheme and has characteristics capable of realizing a magnetic read/write apparatus having an areal recording density of 60 G bits/inch$^2$ or greater. This is because of problems as discussed below that are present in the prior-art thin-film magnetic heads.

First, any one of the thin-film magnetic heads disclosed in the aforementioned publications is intended structurally for the longitudinal magnetic recording scheme and not suitable for the vertical magnetic recording scheme. More specifically, any one of the thin-film magnetic heads disclosed in the aforementioned publications has a thin gap portion and a short throat height, and the yoke portion is arranged to detour around the coil. This structure raises a problem that the magnetic pole portion develops a reduced magnetic field that is perpendicular to the surface of the recording medium. Furthermore, any one of the thin-film magnetic heads disclosed in the aforementioned publications is vulnerable to curving at the edge opposite to the gap portion of the magnetic pole portion, due to the etching for patterning the magnetic pole portion of the second magnetic layer or the steps subsequent to the formation of the magnetic pole portion. This raises a problem that a distortion occurs in the shape of the bit pattern of the recording medium, which makes it difficult to increase the linear recording density. Furthermore, any one of the thin-film magnetic heads disclosed in the aforementioned publications has a structure in which the yoke portion is arranged so as to detour around the coil. The structure raises a problem of having a long magnetic path, which in turn causes a deterioration of the high-frequency characteristics.

On the other hand, in the thin-film magnetic head disclosed in Published Unexamined Japanese Patent Application (KOKAI) No. Heisei 11-102506, the pole portion layer is magnetically connected to the yoke portion layer only at the side surfaces and the top surface. This structure causes the head to have a small area of the connecting portion where the pole portion layer and the yoke portion layer are magnetically connected to each other. Accordingly, this raises a problem that the magnetic flux is saturated at the connecting portion, thereby causing the magnetic pole portion to generate a reduced magnetic field in the medium facing surface.

On the other hand, in the thin-film magnetic head shown in FIG. 2 of "Nikkei Electronics, Sep. 25, 2000 Issue (No. 779), p. 206", the magnetic layer including the main magnetic pole is made up of a single layer. In this head, in order to reduce the thickness of the magnetic layer in the medium facing surface, the entire magnetic layer is made thin. Accordingly, this raises a problem that the magnetic flux tends to be saturated halfway through the magnetic layer and therefore the main magnetic pole generates a reduced magnetic field in the medium facing surface. Moreover, in this head, the entire magnetic layer has to be made flat when considering the need to flatten the main magnetic pole. This causes the head to have a square and long magnetic path. Such a structure makes the head inefficient in terms of the intensity of magnetic field and high-frequency characteristics.

OBJECT AND SUMMARY OF THE INVENTION

It is therefore an object of the present invention to provide a thin-film magnetic head and a method of manufacturing same, which make it possible to increase the intensity of magnetic field generated from the magnetic pole portion in the direction perpendicular to the surface of the recording medium, and to reduce a magnetic path length to improve high-frequency characteristics.

A thin-film magnetic head of the invention comprises:

a medium facing surface that faces toward a recording medium;

a first magnetic layer and a second magnetic layer that include magnetic pole portions disposed so as to oppose to each other with a predetermined spacing interposed therebetween along the traveling direction of the recording medium;

a gap layer made of a non-magnetic material and provided between the first and second magnetic layers;

a coupling portion for magnetically coupling the first magnetic layer and the second magnetic layer to each other at a distance from the medium facing surface; and a thin-film coil at least a part of which is disposed between the first and second magnetic layers and insulated from the first and second magnetic layers, wherein:

a surface of the at least part of the thin-film coil, the surface being closer to the second magnetic layer, is located closer to the first magnetic layer than an end of the gap layer is, the end being located in the medium facing surface next to the second magnetic layer, and than an end of the coupling portion is, the end being closer to the second magnetic layer;

the second magnetic layer has: a pole portion layer including the magnetic pole portion, the width of the pole portion layer measured in the medium facing surface defining a track width; and a yoke portion layer that serves as a yoke portion;

the pole portion layer has a saturated magnetic flux density equal to or greater than that of the yoke portion layer; and the yoke portion magnetically connects the end of the coupling portion closer to the second magnetic layer and an end surface of the pole portion layer, the end surface being farther from the medium facing surface, to each other.

In the thin-film magnetic head of the invention, the second magnetic layer has the pole portion layer and the yoke portion layer. The yoke portion layer has a volume sufficiently enough to introduce magnetic flux into the pole portion layer, and the pole portion layer has a saturated magnetic flux density equal to or greater than that of the yoke portion layer. It is therefore possible to prevent saturation of magnetic flux halfway through the second magnetic layer. Furthermore, in the present invention, a surface of the at least part of the thin-film coil, the surface being closer to the second magnetic layer, is located closer to the first magnetic layer than the end of the gap layer located in the medium facing surface next to the second magnetic layer, and than the end of the coupling portion closer to the second magnetic layer. Furthermore, the yoke portion magnetically connects the end of the coupling portion closer to the second magnetic layer and the end surface of the pole portion layer farther from the medium facing surface to each other. Accordingly, the yoke portion layer can form a short magnetic path for establishing a strong magnetic coupling between the coupling portion and the pole portion layer. Consequently, the present invention makes it possible to increase the intensity of the magnetic field generated from the magnetic pole portion in the direction perpendicular to the surface of the recording medium, and to reduce a magnetic path length, thereby improving high-frequency characteristics.

In the thin-film magnetic head of the invention, the first magnetic layer may be disposed on a trailing side in the traveling direction of the recording medium, and the second magnetic layer may be disposed on a leading side in the traveling direction of the recording medium.

In the thin-film magnetic head of the invention, the yoke portion layer may be shaped so as to form a magnetic path inside thereof, the path connecting the end of the coupling portion closer to the second magnetic layer and the end surface of the pole portion layer farther from the medium facing surface in the shortest distance.

In the thin-film magnetic head of the invention, the distance between the pole portion layer and the first magnetic layer in the medium facing surface may be equal to or greater than the thickness of the coupling portion. In this case, the yoke portion layer may gradually get closer to the first magnetic layer over a region extending from a portion thereof connected to the end surface of the pole portion layer farther from the medium facing surface to a portion thereof connected to the coupling portion.

In the thin-film magnetic head of the invention, at least part of the yoke portion layer may be formed in a shape of an arc that protrudes towards the first magnetic layer.

In the thin-film magnetic head of the invention, the yoke portion layer may be magnetically connected to the end surface of the pole portion layer farther from the medium facing surface, and to both side surfaces of the pole portion layer in the width direction.

In the thin-film magnetic head of the invention, an end of the yoke portion layer, the end being closer to the medium facing surface, may be disposed at a distance from the medium facing surface.

In the thin-film magnetic head of the invention, a portion of the pole portion layer that touches the yoke portion layer may have a width greater than the width of the pole portion layer measured in the medium facing surface.

In the thin-film magnetic head of the invention, the end surface of the pole portion layer farther from the medium facing surface may be located at a distance of 2 $\mu$m or more from the medium facing surface.

The thin-film magnetic head of the invention may further comprise a non-magnetic layer that is in contact with a surface of the pole portion layer that is farther from the gap layer. In this case, the non-magnetic layer may be exposed in the medium facing surface. Part of the yoke portion layer may be adjacent to the surface of the pole portion layer farther from the gap layer via the non-magnetic layer, and may be magnetically connected to the pole portion layer via the non-magnetic layer. The non-magnetic layer may be made of a material having a lower etching rate for dry etching than that of a material of the pole portion layer.

In the thin-film magnetic head of the invention, the at least part of the thin-film coil may be located closer to the first magnetic layer than a midpoint between the first magnetic layer and the second magnetic layer.

In the thin-film magnetic head of the invention, the gap layer may comprise: a first portion that is made of a material exhibiting fluidity during its formation and is filled at least in between windings of the at least part of the thin-film coil; and a second portion made of a material having a better resistance to corrosion, rigidity and insulation property than those of the first portion, the second portion covering the at least part of the thin-film coil and the first portion, and touching the first magnetic layer, the second magnetic layer and the coupling portion. In this case, the first portion may be made of an organic, non-conductive and non-magnetic material, or a spin-on-glass film. The second portion may be made of an inorganic, non-conductive and non-magnetic material.

The thin-film magnetic head of the invention may further comprise a magnetoresistive element as a read element. In this case, the head may further comprise a first shield layer and a second shield layer for shielding the magnetoresistive element, the first and second shield layers having portions that are located on a side of the medium facing surface and opposed to each other, the magnetoresistive element being located between these portions. The first magnetic layer may also serve as the second shield layer.

The thin-film magnetic head of the invention may be employed for a vertical magnetic recording scheme.

A method of the invention is provided for manufacturing a thin-film magnetic head comprising: a medium facing surface that faces toward a recording medium; a first magnetic layer and a second magnetic layer that include magnetic pole portions disposed so as to oppose to each other with a predetermined spacing interposed therebetween along the traveling direction of the recording medium; a gap layer made of a non-magnetic material and provided between the first and second magnetic layers; a coupling portion for magnetically connecting the first magnetic layer and the second magnetic layer to each other at a distance from the medium facing surface; and a thin-film coil at least a part of which is disposed between the first and second magnetic layers and insulated from the first and second magnetic layers, wherein: the second magnetic layer has: a pole portion layer including the magnetic pole portion, the width of the pole portion layer measured in the medium facing surface defining a track width; and a yoke portion layer that serves as a yoke portion; and the pole portion layer has a saturated magnetic flux density equal to or greater than that of the yoke portion layer. The method comprises the steps of:

forming the first magnetic layer;

forming the gap layer, the coupling portion and the thin-film coil on the first magnetic layer, such that a surface of the at least part of the thin-film coil, the surface being closer to the second magnetic layer, is located closer to the first magnetic layer than an end of the gap layer is, the end being located in the medium facing surface next to the second magnetic layer, and than an end of the coupling portion is, the end being closer to the second magnetic layer; and forming the second magnetic layer on the gap layer and the coupling portion, wherein:

the step of forming the second magnetic layer includes the steps of:

forming the pole portion layer on the gap layer; and forming the yoke portion layer on the gap layer and the coupling portion, such that the yoke portion magnetically connects the end of the coupling portion closer to the second magnetic layer and an end surface of the pole portion layer, the end surface being farther from the medium facing surface, to each other.

According to the method of manufacturing a thin-film magnetic head of the invention, the second magnetic layer has the pole portion layer and the yoke portion layer. The yoke portion layer has a volume sufficiently enough to introduce magnetic flux into the pole portion layer, and the pole portion layer has a saturated magnetic flux density equal to or greater than that of the yoke portion layer. It is therefore possible to prevent saturation of magnetic flux halfway through the second magnetic layer. Furthermore, in the present invention, a surface of the at least part of the thin-film coil, the surface being closer to the second magnetic layer, is located closer to the first magnetic layer than the end of the gap layer located in the medium facing surface next to the second magnetic layer, and than the end of the coupling portion closer to the second magnetic layer. Furthermore, the yoke portion magnetically connects the end of the coupling portion closer to the second magnetic layer and the end surface of the pole portion layer farther from the medium facing surface to each other. Accordingly, the yoke portion layer can form a short magnetic path for establishing a strong magnetic coupling between the coupling portion and the pole portion layer. Consequently, the present invention makes it possible to increase the intensity of the magnetic field generated from the magnetic pole portion in the direction perpendicular to the surface of the recording medium, and to reduce a magnetic path length, thereby improving high-frequency characteristics.

In the method of manufacturing a thin-film magnetic head of the invention, the step of forming the pole portion layer may include the steps of: forming a layer to be etched, made of a material for forming the pole portion layer, on the gap layer and the coupling portion; and etching the layer to be etched selectively through dry etching, thereby defining an outer shape of the pole portion layer and exposing the coupling portion.

In this case, the step of forming the pole portion layer may further include, after the step of forming the layer to be etched, the step of flattening a top surface of the layer to be etched, by polishing. The step of forming the pole portion layer may further include, before the step of forming the layer to be etched, the step of flattening a base of the layer to be etched, by polishing. The step of forming the pole portion layer may further include, after the step of forming the layer to be etched, the steps of: forming a non-magnetic layer on the layer to be etched; and forming a mask corresponding to the shape of the pole portion layer, on the non-magnetic layer, wherein, in the step of etching the layer to be etched, the non-magnetic layer and the layer to be etched may be etched through the use of the mask. In the step of forming the mask, a resist frame having a gap portion corresponding to the shape of the pole portion layer may be formed on the non-magnetic layer, and the mask may be formed inside the gap portion of the resist frame.

In the method of manufacturing a thin-film magnetic head of the invention, the yoke portion layer may be formed by electroplating. In this case, the step of forming the yoke portion layer may include the steps of: forming a resist cover for covering a part of the pole portion layer located near the medium facing surface; forming an electrode layer for electroplating on the resist cover, the pole portion layer, the gap layer and the coupling portion; and forming the yoke portion layer by electroplating using the electrode layer.

Other and further objects, features and advantages of the invention will appear more fully from the following description.

DETAILED DESCRIPTION OF THE PREFERRED EMBODIMENTS

An embodiment of the invention will now be described in detail with reference to the accompanying drawings.

Figure 1:
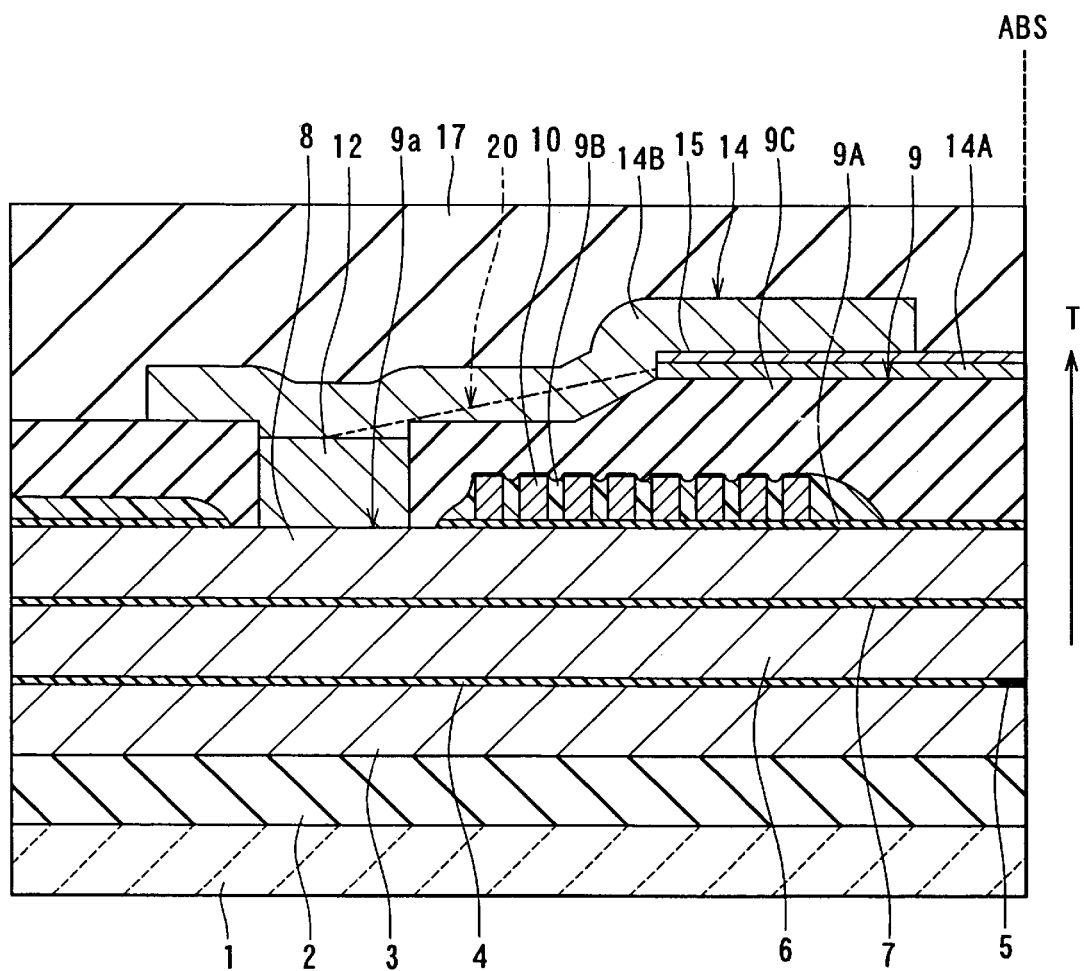
FIG. 1 is a cross-sectional view illustrating the structure of a thin-film magnetic head according to an embodiment of the invention.
Figure 2:
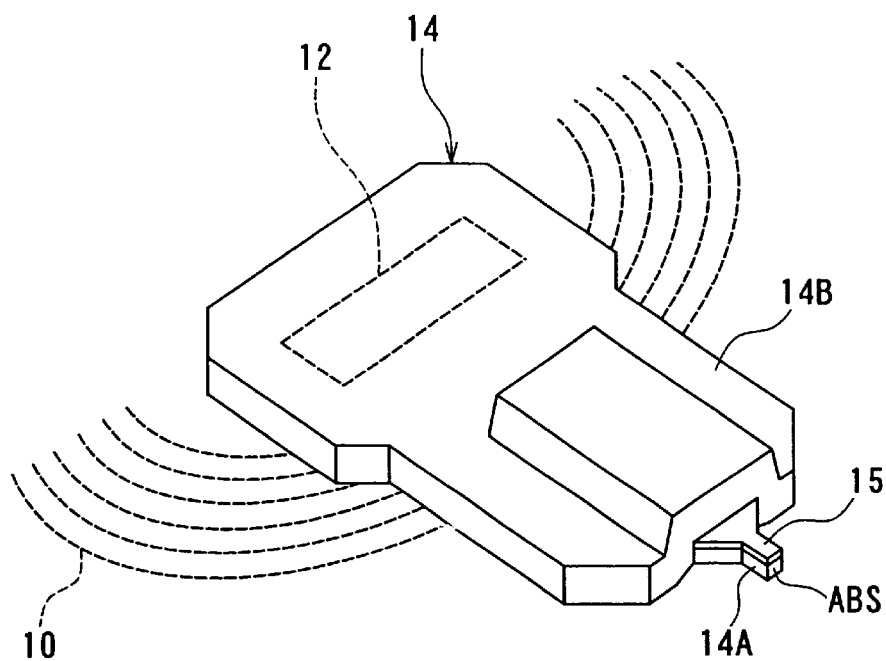
FIG. 2 is a perspective view illustrating the main part of the thin-film magnetic head shown in FIG. 1.
Figure 3:
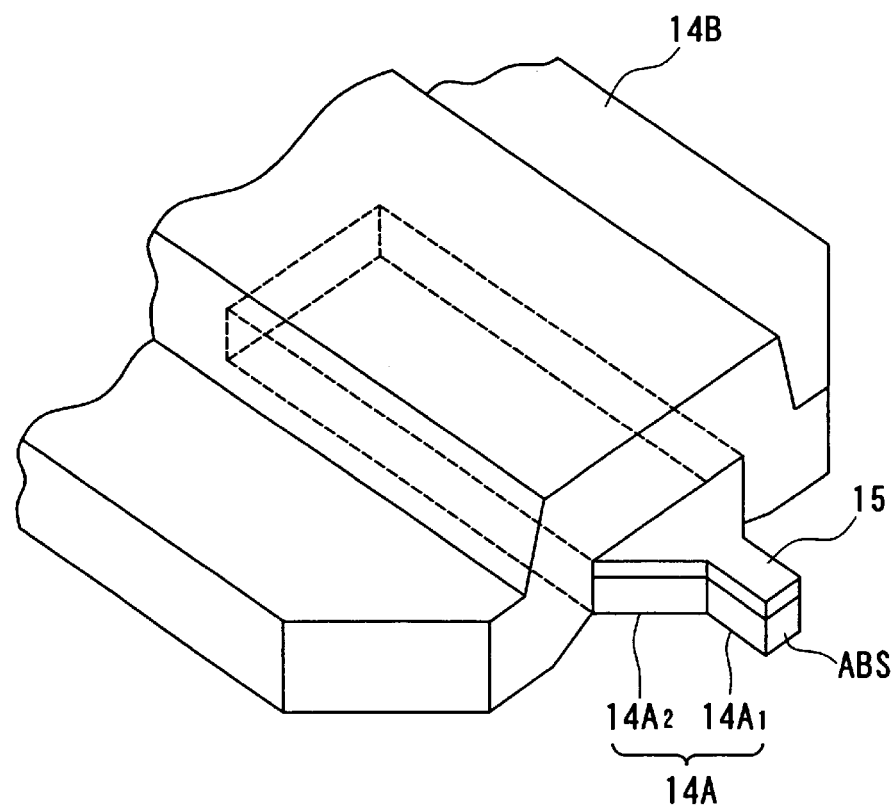
FIG. 3 is an enlarged perspective view illustrating the vicinity of the magnetic pole portion shown in FIG. 2.
Figure 4:
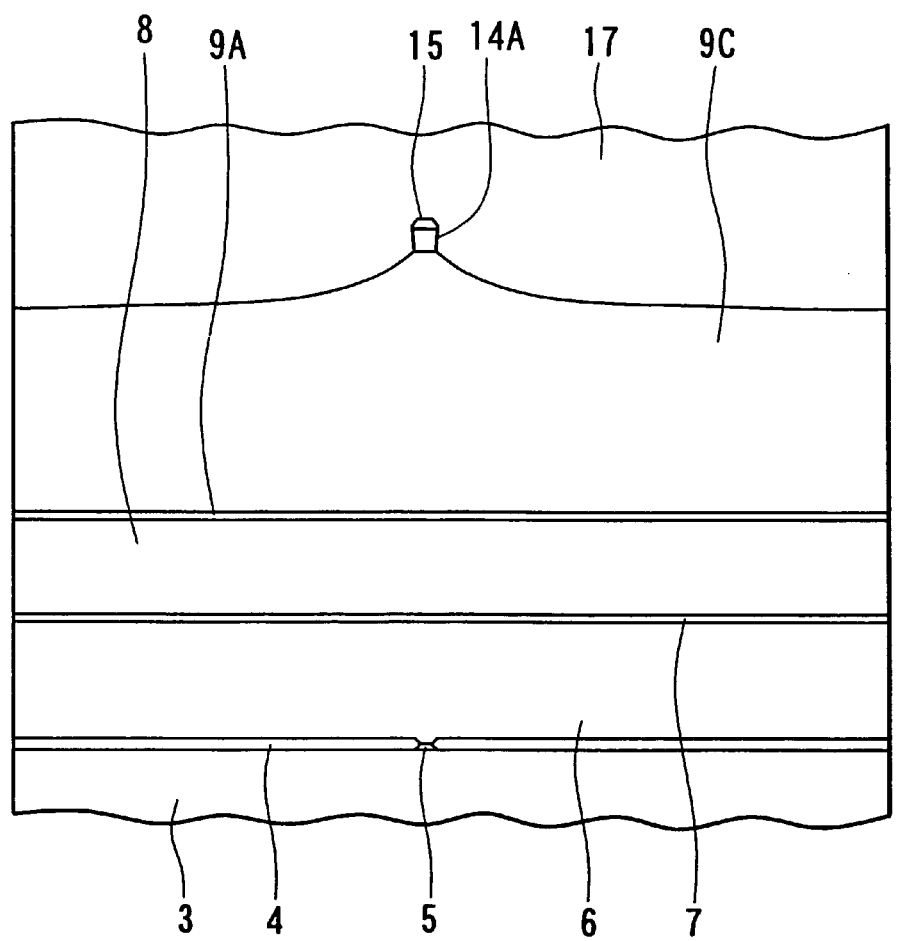
FIG. 4 is a front view illustrating part of the medium facing surface of the thin-film magnetic head shown in FIG. 1.
Figure 5:
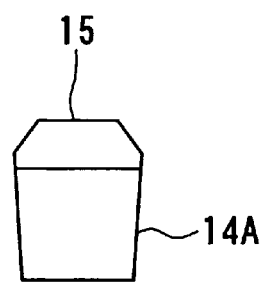
FIG. 5 is an enlarged front view illustrating the pole portion layer and the non-magnetic layer shown in FIG. 4.

FIG. 1 is a cross-sectional view illustrating the structure of a thin-film magnetic head according to an embodiment of the invention. FIG. 1 shows a cross section orthogonal to the medium facing surface and the surface of the substrate. In addition, the arrow indicated by symbol T in FIG. 1 shows the traveling direction of a recording medium. FIG. 2 is a perspective view illustrating the main part of the thin-film magnetic head shown in FIG. 1. FIG. 3 is an enlarged perspective view illustrating the vicinity of the magnetic pole portion shown in FIG. 2. FIG. 4 is a front view illustrating part of the medium facing surface of the thin-film magnetic head shown in FIG. 1. FIG. 5 is an enlarged front view illustrating the pole portion layer and the non-magnetic layer shown in FIG. 4.

As shown in FIG. 1, the thin-film magnetic head according to this embodiment comprises: a substrate 1 made of a ceramic material such as aluminum oxide and titanium carbide ($Al_2O_3 \cdot TiC$); an insulating layer 2 made of an insulating material such as alumina ($Al_2O_3$) and formed on the substrate 1; a bottom shield layer 3 made of a magnetic material and formed on the insulating layer 2; an MR (magnetoresistive) element 5 functioning as a read element and formed on the bottom shield layer 3 via an insulating layer 4; and a top shield layer 6 made of a magnetic material and formed on the MR element 5 via the insulating layer 4. Each of the bottom shield layer 3 and the top shield layer 6 has a thickness of, for example, 1 to 2 $\mu$m.

One of ends of the MR element 5 is located in the medium facing surface (air bearing surface) ABS. The MR element 5 may be an element made of a magnetosensitive film that exhibits a magnetoresistive effect, such as an anisotropic magnetoresistive (AMR) element, a giant magnetoresistive (GMR) element, or a tunneling magnetoresistive (TMR) element.

The thin-film magnetic head further comprises: a non-magnetic layer 7 formed on the top shield layer 6; a first magnetic layer 8 made of a magnetic material and formed on the non-magnetic layer 7; an insulating layer 9A formed on a portion of the first magnetic layer 8 in which a thin-film coil 10 is to be formed; the thin-film coil 10 formed on the insulating layer 9A; and an insulating layer 9B filled at least between windings of the thin-film coil 10. There is formed a contact hole 9a in the insulating layer 9A at a distance from the medium facing surface ABS.

For example, the first magnetic layer 8 has a thickness of 1 to 2 µm. The magnetic material for making the first magnetic layer 8 may be an iron-nickel-based alloy or Permalloy, or a high saturated magnetic flux density material to be described later.

The insulating layer 9A is made of a non-conductive and non-magnetic material such as alumina, and has a thickness of 0.1 to 1 µm, for example.

The thin-film coil 10 is made of a conductive material such as copper, and the winding thereof is 0.3 to 2 µm in thickness, for example. Thin-film coil 10 can have any number of turns of the winding as well as any pitch of the winding. In this embodiment, as an example, the winding of the thin-film coil 10 has a thickness of 1.3 µm, a width of 0.8 µm, a pitch of 1.3 µm, and the number of turns of 8.

The insulating layer 9B is made of a non-conductive and non-magnetic material that exhibits fluidity during its formation. More specifically, the insulating layer 9B may be formed of an organic, non-conductive and non-magnetic material such as photoresist (a photosensitive resin), or a spin-on-glass (SOG) film of coating glass.

The thin-film magnetic head further comprises: a coupling portion 12 made of a magnetic material and formed on a portion of the first magnetic layer 8 in which the contact hole 9a is formed; and an insulating layer 9C formed so as to cover the thin-film coil 10 and the insulating layers 9A and 9B. The thin-film coil 10 is wound around the coupling portion 12.

For example, the coupling portion 12 has a thickness of 2 to 4 µm, a depth (or the length perpendicular to the medium facing surface ABS) of 2 to 10 µm, and a width of 5 to 20 µm. For example, the magnetic material making the coupling portion 12 may be an iron-nickel-based alloy or Permalloy, or a high saturated magnetic flux density material as described later.

The insulating layer 9C is made of a non-conductive and non-magnetic material which has a better resistance to corrosion, rigidity, and insulating strength than those of the insulating layer 9B. As such a material, an inorganic, non-conductive and non-magnetic material such as alumina and silicon dioxide ($SiO_2$) may be used. The total thickness of the insulating layers 9A and 9C in the medium facing surface ABS is, for example, 2 to 4 µm. This thickness should be equal to or greater than the thickness of the coupling portion 12.

The insulating layers 9A, 9B and 9C make up a gap layer 9 that is provided between the first magnetic layer 8 and a second magnetic layer 14 to be described later. The insulating layer 9B corresponds to the first portion of the gap layer of the present invention, and the insulating layers 9A and 9C correspond to the second portion of the gap layer of the present invention.

The thin-film magnetic head further comprises the second magnetic layer 14 made of a magnetic material and formed on the insulating layer 9C and the coupling portion 12 over a region extending from the medium facing surface ABS to at least the coupling portion 12. The second magnetic layer 14 has a pole portion layer 14A including a magnetic pole portion and a yoke portion layer 14B that serves as a yoke portion. The pole portion layer 14A is formed on the insulating layer 9C over a region extending from the medium facing surface ABS to a predetermined position located between the medium facing surface ABS and the coupling portion 12. The yoke portion layer 14B magnetically connects an end of the coupling portion 12, the end being closer to the second magnetic layer 14 (hereinafter referred to as the upper end), and an end surface of the pole portion layer 14A, the end surface being farther from the medium facing surface ABS (hereinafter referred to as the rear end surface), to each other. In addition, the yoke portion layer 14B has such a shape as allows to form a magnetic path 20, inside the yoke portion layer 14B, for connecting the upper end of the coupling portion 12 and the rear end surface of the pole portion layer 14A in the shortest distance. The thin-film magnetic head further comprises a non-magnetic layer 15 that is formed on the pole portion layer 14A. Part of the yoke portion layer 14B located closer to the medium facing surface ABS is adjacent to the top surface of the pole portion layer 14A via the non-magnetic layer 15, and magnetically connected to the pole portion layer 14A via the non-magnetic layer 15. The thin-film magnetic head further comprises a protective layer 17 made of a non-conductive and non-magnetic material such as alumina and formed to cover the second magnetic layer 14.

A surface of the thin-film coil 10 that is closer to the second magnetic layer 14 is located closer to the first magnetic layer 8 than an end of the gap layer 9, the end being located in the medium facing surface ABS next to the second magnetic layer 14 (or the end of the insulating layer 9C closer to the second magnetic layer 14).

The pole portion layer 14A is preferably 0.1 to 0.8 µm in thickness and more preferably 0.3 to 0.8 µm. In this embodiment, as an example, the pole portion layer 14A is 0.5 µm in thickness. In addition, the length from the medium facing surface ABS to the rear end surface of the pole portion layer 14A is 2 µm or greater. In this embodiment, as an example, the length is 10 µm.

As shown in FIG. 3, the pole portion layer 14A includes a first portion $14A_1$ located next to the medium facing surface ABS and a second portion $14A_2$ located farther from the medium facing surface ABS than the first portion $14A_1$. The first portion $14A_1$ is the magnetic pole portion of the second magnetic layer 14. The magnetic pole portion of the first magnetic layer 8 includes a portion of the first magnetic layer 8 that is opposed to the first portion $14A_1$ via the gap layer 9.

The first portion $14A_1$ has a width equal to the track width. That is, the width of the first portion $14A_1$ in the medium facing surface ABS defines the track width. The second portion $14A_2$ has a width equal to that of the first portion $14A_1$ at the interface with the first portion $14A_1$. The width of the second portion $14A_2$ gradually increases from this interface with an increase in distance from the medium facing surface ABS, and finally becomes constant. A portion of the yoke portion layer 14B located near the medium facing surface ABS is laid over the second portion $14A_2$ of the pole portion layer 14A via the non-magnetic layer 15.

The width of the first portion $14A_1$ in the medium facing surface ABS, that is, the track width, is preferably 0.5 µm or less, and more preferably 0.3 µm or less. The portion of the second portion $14A_2$ overlapping the yoke portion layer 14B has a width greater than that of the first portion $14A_1$ in the medium facing surface ABS, and the width is 2 µm or more, for example.

For example, the yoke portion layer 14B has a thickness of 1 to 2 μm. The yoke portion layer 14B is magnetically connected to the rear end surface of the pole portion layer 14A as shown in FIG. 1, while being magnetically connected to both side surfaces of the pole portion layer 14A in the width direction, as shown in FIG. 3. For example, an end of the yoke portion layer 14B, the end being closer to the medium facing surface ABS, is located apart from the medium facing surface ABS by 1.5 μm or more.

The pole portion layer 14A has a saturated magnetic flux density equal to or greater than that of the yoke portion layer 14B. As the magnetic material to form the pole portion layer 14A, it is preferable to use a high saturated magnetic flux density material having a saturated magnetic flux density of 1.4 T or more. For example, as the high saturated magnetic flux density material, available are a material containing iron and nitrogen atoms, a material containing iron, zirconia and oxygen atoms, and a material containing iron and nickel elements. More specifically, for example, as the high saturated magnetic flux density material, it is possible to use at least one of NiFe (Ni: 45 wt %, Fe: 55 wt %), FeN and its compounds, Co-based amorphous alloys, Fe—Co, Fe-M (including oxygen atoms as required), and Fe—Co-M (including oxygen atoms as required). In the foregoing, M is at least one element selected from the group consisting of Ni, N, C, B, Si, Al, Ti, Zr, Hf, Mo, Ta, Nb, and Cu (all of which stand for chemical elements).

As the magnetic material to form the yoke portion layer 14B, it is possible to use a material containing iron and nickel elements and having a saturated magnetic flux density of the order of 1.0 T, for example. Such a material has a good resistance to corrosion and a higher resistance than that of the material to form the pole portion layer 14A. Use of such a material will facilitate formation of the yoke portion layer 14B.

To form the yoke portion layer 14B, it is also possible to use a magnetic material that is the same in compositional family as the magnetic material used to form the pole portion layer 14A. In this case, to make the saturated magnetic flux density of the yoke portion layer 14B lower than that of the pole portion layer 14A, it is preferable to use, as the magnetic material for forming the yoke portion layer 14B, a material having a lower compositional ratio of iron atoms than that of the magnetic material used to form the pole portion layer 14A.

The non-magnetic layer 15 is identical to the pole portion layer 14A in planar shape. In addition, the non-magnetic layer 15 is exposed in the medium facing surface ABS. The non-magnetic layer 15 is preferably 0.5 μm or less in thickness. In this embodiment, as an example, the non-magnetic layer 15 is 0.3 μm in thickness. It is also possible to omit the non-magnetic layer 15.

The non-magnetic layer 15 may be formed of, for example, a material containing titanium or tantalum (including their alloys and oxides) or an inorganic, non-conductive and non-magnetic material such as alumina or silicon dioxide ($SiO_2$). If dry etching is used to form the pole portion layer 14A, it is preferable that the non-magnetic layer 15 is formed of a material having a lower etching rate for the dry etching than those of the materials that form the pole portion layer 14A and the insulating layer 9C, of the gap layer 9, which is disposed in contact with the pole portion layer 14A. For example, available for this purpose are materials containing titanium or tantalum (including their alloys and oxides).

The surface of the pole portion layer 14A exposed in the medium facing surface ABS has a shape as shown in FIGS. 4 and 5. It may have a shape of a rectangle, or a shape of a trapezoid or a triangle in which the lower side located on the trailing side in the traveling direction T of the recording medium (or on the air-inflow-end side of the slider) is shorter than the upper side. In addition, the side surfaces of the pole portion layer 14A may be concave. It is also preferable that the side of the surface of the pole portion layer 14A exposed in the medium facing surface ABS forms an angle of 80 to 88 degrees relative to the surface of the substrate 1.

As described above, the thin-film magnetic head according to this embodiment comprises the medium facing surface ABS that faces toward the recording medium, a read head, and a write head. The read head comprises the MR element 5 functioning as a read element, and the bottom shield layer 3 and the top shield layer 6 for shielding the MR element 5. The bottom and top shield layers 3 and 6 have portions that are located on a side of the medium facing surface and opposed to each other with the MR element 5 interposed therebetween.

The write head comprises: the first magnetic layer 8 and the second magnetic layer 14 that include magnetic pole portions disposed on a side of the medium facing surface ABS so as to oppose to each other with a predetermined spacing interposed therebetween along the traveling direction T of the recording medium; the gap layer 9 made of a non-magnetic material and provided between the first magnetic layer 8 and the second magnetic layer 14; the coupling portion 12 for magnetically coupling the first magnetic layer 8 and the second magnetic layer 14 to each other at a distance from the medium facing surface ABS; and the thin-film coil 10 at least apart of which is disposed between the first and second magnetic layers 8 and 14 and insulated from the first and second magnetic layers 8 and 14.

In this embodiment, a part of the thin-film coil 10 is disposed between the magnetic layers 8 and 14, and a surface of the part of the coil, the surface being located closer to the second magnetic layer 14 (the surface on the upper side of FIG. 1), is located closer to the first magnetic layer 8 (on the lower side of FIG. 1) than the end of the gap layer 9 (the end on the upper side of FIG. 1) located in the medium facing surface ABS next to the second magnetic layer 14.

In addition, the second magnetic layer 14 has the pole portion layer 14A including the magnetic pole portion, and the yoke portion layer 14B that serves as a yoke portion. The width of the pole portion layer 14A measured in the medium facing surface ABS defines the track width. The pole portion layer 14A has a saturated magnetic flux density equal to or greater than that of the yoke portion layer 14B. The yoke portion layer 14B magnetically connects the upper end of the coupling portion 12 and the rear end surface of the pole portion layer 14A to each other.

The thin-film magnetic head according to this embodiment is suitable for the vertical magnetic recording scheme. When this thin-film magnetic head is used for the vertical magnetic recording scheme, the first portion $14A_1$ of the pole portion layer 14A of the second magnetic layer 14 serves as a main magnetic pole, while the magnetic pole portion of the first magnetic layer 8 serves as an auxiliary magnetic pole. When the thin-film magnetic head of this embodiment is used for the vertical magnetic recording scheme, it is possible to use either a two-layered medium or a single-layered medium as the recording medium.

In the thin-film magnetic head of this embodiment, the second magnetic layer 14 has the pole portion layer 14A and the yoke portion layer 14B. The yoke portion layer 14B has a volume sufficient to introduce magnetic flux into the pole portion layer 14A, and the pole portion layer 14A has a saturated magnetic flux density equal to or greater than that of the yoke portion layer 14B. Therefore, it is possible to prevent the magnetic flux from being saturated on the way through the second magnetic layer 14.

Furthermore, in this embodiment, a part of the thin-film coil 10 is disposed between the magnetic layers 8 and 14, and the surface of that part closer to the second magnetic layer 14 is located closer to the first magnetic layer 8 than the end of the gap layer 9 located in the medium facing surface ABS next to the second magnetic layer 14, and also than the upper end of the coupling portion 12. In addition, the yoke portion layer 14B magnetically connects the upper end of the coupling portion 12 and the rear end surface of the pole portion layer 14A to each other. Accordingly, the yoke portion layer 14B can form a strong magnetic coupling between the coupling portion 12 and the pole portion layer 14A in a short magnetic path.

With these features as described in the foregoing, this embodiment allows the magnetic pole portion of the second magnetic layer 14 to produce a magnetic field with increased intensity in the direction perpendicular to the surface of the recording medium, and reduces the magnetic path length, thereby improving the high-frequency characteristics. In particular, when the pole portion layer 14A is formed of a high saturated magnetic flux density material, it is possible to especially increase the intensity of the magnetic field in the direction perpendicular to the surface of the recording medium, and it is thereby possible to write data on a recording medium having an enhanced coercivity.

Furthermore, in the thin-film magnetic head of this embodiment, the magnetic field produced in the direction perpendicular to the surface of the recording medium is greater than the magnetic field in the longitudinal direction. Therefore, the magnetic energy produced by the head can be transferred to the recording medium efficiently. Accordingly, this thin-film magnetic head can be made impervious to heat fluctuations of the recording medium, and can thereby increase the linear recording density.

In the thin-film magnetic head of this embodiment, as shown in FIG. 1, it is preferable to dispose the first magnetic layer 8 on the trailing side in the traveling direction T of the recording medium (or on the air-inflow-end side of the slider including the thin-film magnetic head), and to dispose the second magnetic layer 14 on the leading side in the traveling direction T of the recording medium (or on the air-outflow-end side of the slider including the thin-film magnetic head). For the vertical magnetic recording scheme, this arrangement allows the magnetization reversal transition width to be reduced in the recording medium, as compared with a reverse of this arrangement. This makes it possible to form a magnetization pattern of a higher density on the recording medium, resulting in a higher linear recording density.

Furthermore, as shown in FIG. 1, in the thin-film magnetic head of this embodiment the yoke portion layer 14B of the second magnetic layer 14 is shaped so as to form the magnetic path 20 inside thereof, which connects the upper end of the coupling portion 12 and the rear end surface of the pole portion layer 14A in the shortest distance. This can especially reduce the magnetic path length and can thereby improve high-frequency characteristics.

Furthermore, as shown in FIG. 3, in the thin-film magnetic head of this embodiment the distance between the pole portion layer 14A and the first magnetic layer 8 in the medium facing surface ABS is equal to or greater than the thickness of the coupling portion 12. In addition, the yoke portion layer 14B gradually gets closer to the first magnetic layer 8 over a region extending from the portion connected to the rear end surface of the pole portion layer 14A to the portion connected to the coupling portion 12. It is thereby possible to especially reduce the magnetic path length and to thereby improve high-frequency characteristics.

Furthermore, as shown in FIG. 1, in the thin-film magnetic head of this embodiment, at least part of the yoke portion layer 14B is formed in the shape of an arc that protrudes towards the first magnetic layer 8. This causes part of the yoke portion layer 14B to stay closer to the thin-film coil 10, thereby allowing the magnetic field generated by the thin-film coil 10 to be absorbed efficiently by the yoke portion layer 14B.

Furthermore, as shown in FIG. 3, in the thin-film magnetic head of this embodiment the yoke portion layer 14B is magnetically connected to the rear end surface and both side surfaces of the pole portion layer 14A. It is thereby possible to obtain a greater area of a connecting portion where the yoke portion layer 14B and the pole portion layer 14A are connected to each other, even if the pole portion layer 14A is small in volume. This prevents the magnetic flux from being saturated at this connecting portion. Consequently, it is possible to efficiently introduce the magnetic flux from the yoke portion layer 14B into the pole portion layer 14A, and to thereby increase the intensity of the magnetic field applied to the recording medium.

Furthermore, as shown in FIG. 1, in the thin-film magnetic head of this embodiment the end of the yoke portion layer 14B closer to the medium facing surface ABS is located at a distance from the medium facing surface ABS. This makes it possible to prevent the magnetic field, produced from the end of the yoke portion layer 14B closer to the medium facing surface ABS, from causing writing of information onto the recording medium.

Furthermore, as shown in FIG. 2, in the thin-film magnetic head of this embodiment, the portion of the pole portion layer 14A touching the yoke portion layer 14B has a width greater than the width of the pole portion layer 14A measured in the medium facing surface ABS. This allows the portion of the pole portion layer 14A touching the yoke portion layer 14B to be large in area, and thereby makes it possible to prevent a saturation of magnetic flux at this portion. Consequently, it is possible to efficiently introduce the magnetic flux from the yoke portion layer 14B into the pole portion layer 14A. Furthermore, the portion of the pole portion layer 14A exposed in the medium facing surface ABS can be made smaller in area, to make it possible to increase the intensity of magnetic field applied to the recording medium.

In the thin-film magnetic head of this embodiment, the length from the medium facing surface ABS to the rear end surface of the pole portion layer 14A may be 2 $\mu$m or more. This allows to attain a large area of the portion of the pole portion layer 14A touching the yoke portion layer 14B, without increasing the thickness or width of the pole portion layer 14A. Saturation of magnetic flux at this portion is thereby prevented. Consequently, it is possible to introduce the magnetic flux efficiently from the yoke portion layer 14B into the pole portion layer 14A.

Furthermore, as shown in FIG. 1, the thin-film magnetic head of this embodiment has the non-magnetic layer 15 that is in contact with the surface of the pole portion layer 14A farther from the gap layer 9. Accordingly, it is possible to prevent the surface of the pole portion layer 14A farther from the gap layer 9 from being damaged when forming the pole portion layer 14A by dry etching or when forming the yoke portion layer 14B by electroplating, and thereby possible to make the surface flat. Particularly, since the non-magnetic layer 15 is exposed in the medium facing surface ABS, the end of the pole portion layer 14A farther from the gap layer 9 can be kept flat in the medium facing surface ABS. This allows the magnetic field generated from the pole portion layer 14A in the medium facing surface ABS to be made uniform in the direction intersecting the track. Consequently, it is possible to prevent the bit pattern of the recording medium from being distorted in shape, and to thereby improve the linear recording density.

Furthermore, in this embodiment, part of the yoke portion layer 14B located near the medium facing surface ABS is adjacent to the surface of the pole portion layer 14A farther from the gap layer 9 via the non-magnetic layer 15, and magnetically connected to the pole portion layer 14A via the non-magnetic layer 15. Consequently, it is possible to introduce magnetic flux from the yoke portion layer 14B to the medium-facing-surface-ABS side of the pole portion layer 14A via the non-magnetic layer 15, through the surface of the pole portion layer 14A farther from the gap layer 9, too.

If the non-magnetic layer 15 is formed of a material having a less etching rate than those of the materials forming the pole portion layer 14A and the portion of the gap layer 9 touching the pole portion layer 14A, it is possible to prevent the surface of the pole portion layer 14A farther from the gap layer 9 from being damaged when forming the pole portion layer 14A by dry etching.

In the thin-film magnetic head of this embodiment, as shown in FIG. 1, part of the thin-film coil 10 is disposed between the first and second magnetic layers 8 and 14, and the part of the coil is located closer to the first magnetic layer 8 than the midpoint between the first and second magnetic layers 8 and 14. This arrangement allows the first magnetic layer 8 that is larger in volume than the second magnetic layer 14 to efficiently absorb the magnetic field produced by the thin-film coil 10. It is thereby possible to increase the absorptivity of magnetic field in the first and second magnetic layers 8 and 14 as compared with the case where the thin-film coil 10 is located closer to the second magnetic layer 14.

As shown in FIG. 1, in the thin-film magnetic head of this embodiment the gap layer 9 comprises: a first portion (the insulating layer 9B) that is made of a material exhibiting fluidity during its formation and is filled at least in between the windings of the thin-film coil 10; and a second portion (the insulating layers 9A, 9C) made of a material having a better resistance to corrosion, rigidity, and insulation property than those of the first portion. The second portion covers the thin-film coil 10 and the first portion, and touches the first magnetic layer 8, the second magnetic layer 14 and the coupling portion 12. The second portion of the gap layer 9 is exposed in the medium facing surface ABS. Although it is difficult to completely fill in the spaces between the windings of the thin-film coil 10 with a non-magnetic material by sputtering, it is made easy by using a non-magnetic material having fluidity like organic materials. Nevertheless, organic materials lack reliability in resistance to dry etching, resistance to corrosion, resistance to heat, rigidity and the like. In this embodiment, as described above, the first portion (the insulating layer 9B) is formed of a material exhibiting fluidity during its formation and is filled in between the windings of the thin-film coil 10. In addition, the second portion (the insulating layers 9A, 9C) is formed of a material having a better resistance to corrosion, rigidity, and insulation property than those of the first portion, to cover the thin-film coil 10 and the first portion and to touch the first magnetic layer 8, the second magnetic layer 14 and the coupling portion 12. Accordingly, it is possible to completely fill the spaces between the windings of the thin-film coil 10 with the non-magnetic material and to thereby increase the reliability of the gap layer 9.

The thin-film magnetic head of this embodiment further comprises the MR element 5 serving as a read element. It is thereby possible to improve the read performance as compared with the case where reading is performed by using an induction-type electromagnetic transducer. Since the MR element 5 is shielded with the shield layers 3 and 6, the resolution of read operations is improved.

Figure 6:
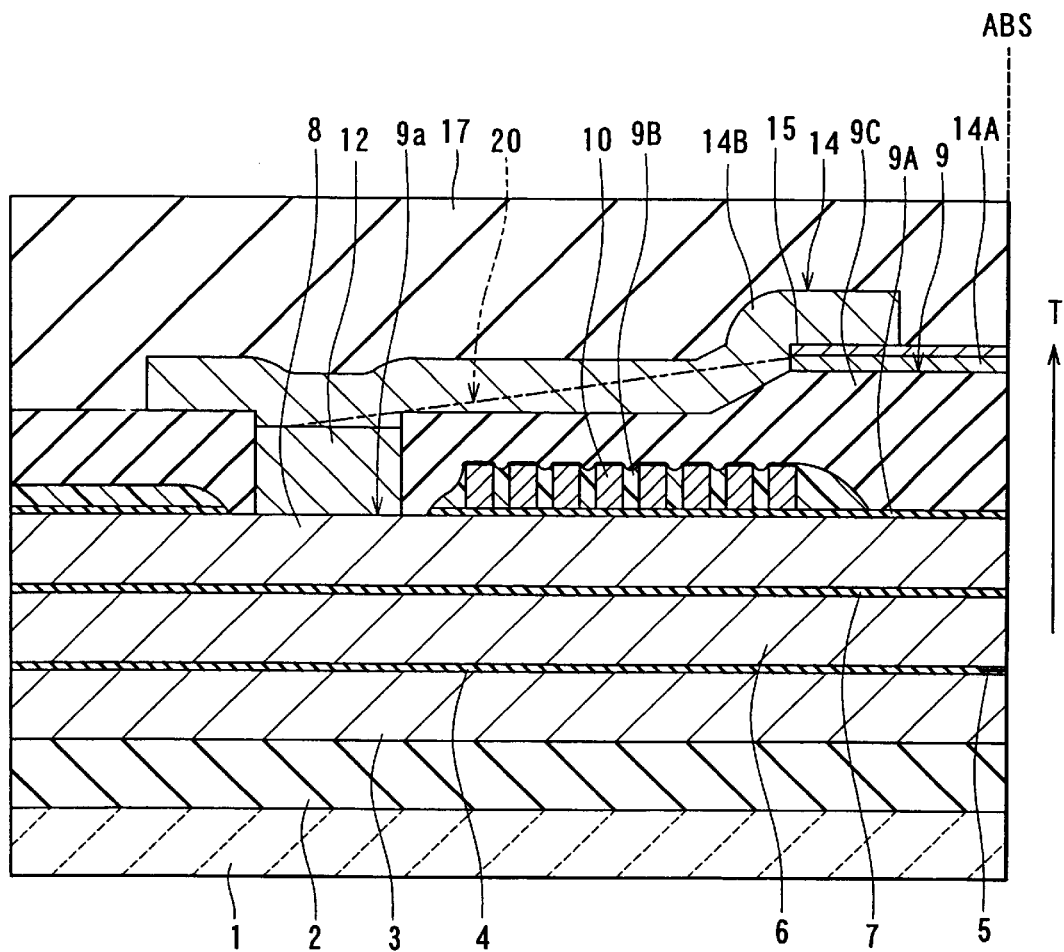
FIG. 6 is a cross-sectional view illustrating the structure of a thin-film magnetic head according to a first modified example of the embodiment of the invention.
Figure 7:
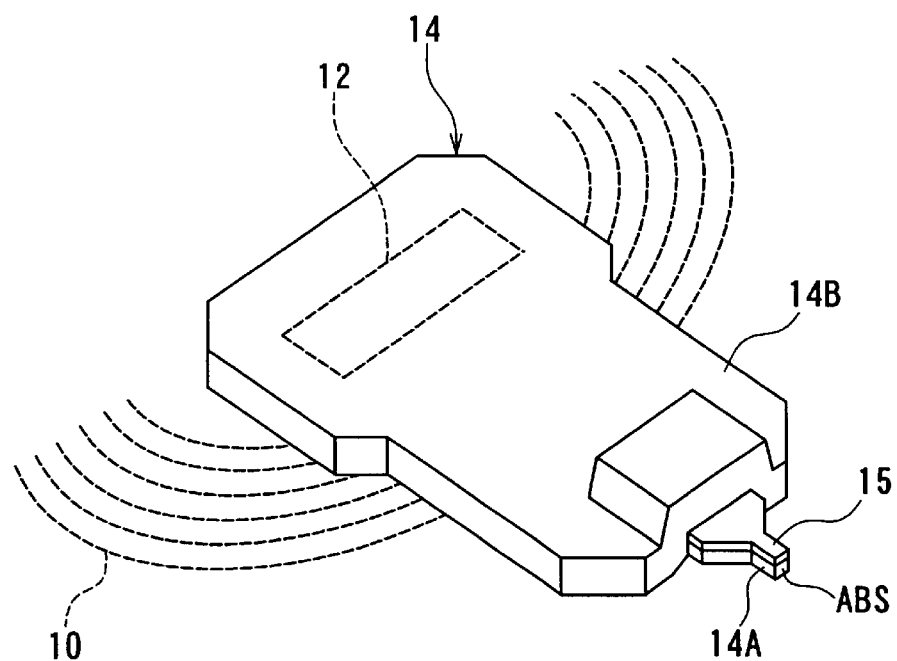
FIG. 7 is a perspective view illustrating the main part of the thin-film magnetic head shown in FIG. 6.
Figure 8:
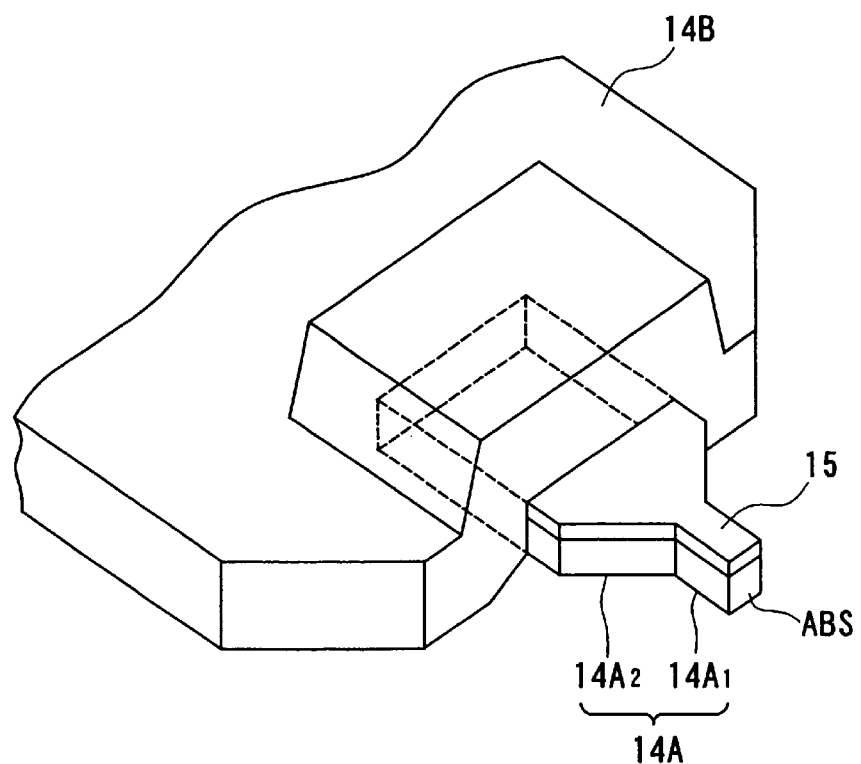
FIG. 8 is an enlarged perspective view illustrating the vicinity of the magnetic pole portion shown in FIG. 7.

Now, referring to FIGS. 6 to 8, a first modified example of the thin-film magnetic head according to this embodiment is explained below. FIG. 6 is a cross-sectional view illustrating the structure of a thin-film magnetic head of the first modified example. FIG. 6 illustrates a cross section orthogonal to the medium facing surface and the surface of the substrate. FIG. 7 is a perspective view illustrating the main part of the thin-film magnetic head shown in FIG. 6. FIG. 8 is an enlarged perspective view illustrating the vicinity of the magnetic pole portion shown in FIG. 7.

In the thin-film magnetic head of the first modified example, the length from the medium facing surface ABS to the rear end surface of the pole portion layer 14A is shorter than that of the thin-film magnetic head shown in FIG. 1. In this modified example, the length is 5 μm as an example. The planar shape of the non-magnetic layer 15 is the same as that of the pole portion layer 14A. The remainder of the structure of the thin-film magnetic head of the first modified example is the same as that of the thin-film magnetic head shown in FIG. 1.

Figure 9:
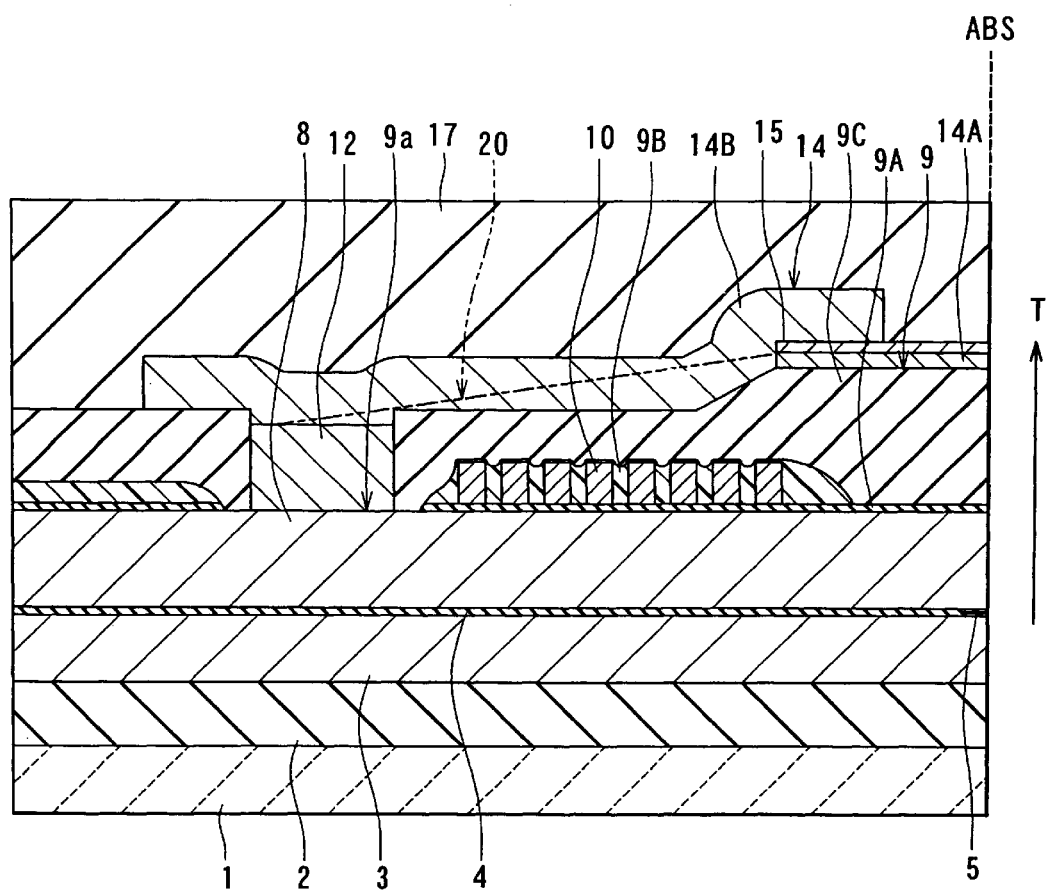
FIG. 9 is a cross-sectional view illustrating the structure of a thin-film magnetic head according to a second modified example of the embodiment of the invention.

Now, referring to FIG. 9, a second modified example of the thin-film magnetic head according to this embodiment is explained below. FIG. 9 is a cross-sectional view illustrating the structure of a thin-film magnetic head of the second modified example. FIG. 9 illustrates a cross section orthogonal to the medium facing surface and the surface of the substrate.

In the thin-film magnetic head of the second modified example, the top shield layer 6 and the non-magnetic layer 7 of the thin-film magnetic head of the first modified example are eliminated and the first magnetic layer 8 is allowed to serve as the top shield layer 6, too. It simplifies the structure of the thin-film magnetic head and facilitates manufacture of the head. The remainder of the configuration of the thin-film magnetic head of the second modified example is the same as that of the thin-film magnetic head of the first modified example.

Now, referring to FIGS. 10 to 25, a method of manufacturing the thin-film magnetic head according to this embodiment is explained below. Here, the method is explained with reference to the thin-film magnetic head shown in FIG. 6 as an example. However, the same method may be used to manufacture the thin-film magnetic head shown in FIG. 1. The following description is also applicable to the manufacture of the thin-film magnetic head shown in FIG. 9 except that the steps of forming the top shield layer 6 and the non-magnetic layer 7 are eliminated.

According to the method of manufacturing the thin-film magnetic head of this embodiment, the insulating layer 2 is first formed on the substrate 1. Then, the bottom shield layer 3 is formed on the insulating layer 2. In FIGS. 10 to 25, the substrate 1 and the insulating layer 2 are not shown.

Figure 10:
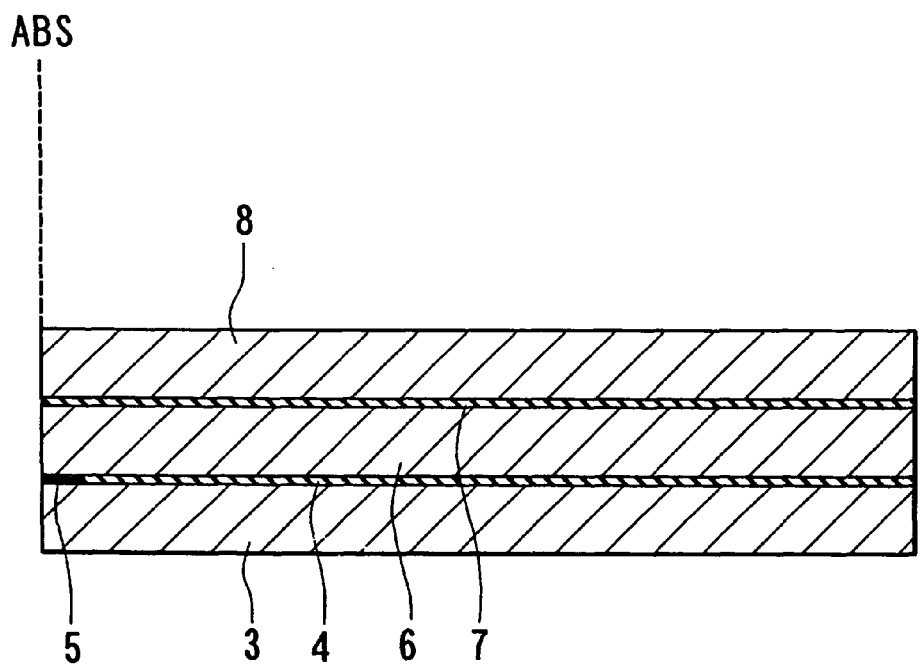
FIG. 10 is a cross-sectional view illustrating a step of a method of manufacturing the thin-film magnetic head according to the embodiment of the invention.

Then, as shown in FIG. 10, an insulating film to be a part of the insulating layer 4 is formed on the bottom shield layer 3. On this insulating film, formed are the MR element 5 and leads (not shown) to be connected to the MR element 5. Then, the MR element 5 and the leads are covered with another insulating film that makes the other part of the insulating layer 4, and the MR element 5 and the leads are embedded in the insulating layer 4.

Then, the top shield layer 6 is formed on the insulating layer 4, and the non-magnetic layer 7 is formed on the top shield layer 6. Then, on the non-magnetic layer 7, the first magnetic layer 8 is formed to have a predetermined shape. Then, although not shown, the non-magnetic layer 7 and the first magnetic layer 8 are covered with a non-magnetic material such as alumina. The non-magnetic material is then polished to expose the first magnetic layer 8, and the top surface of the first magnetic layer 8 is flattened.

Figure 11:
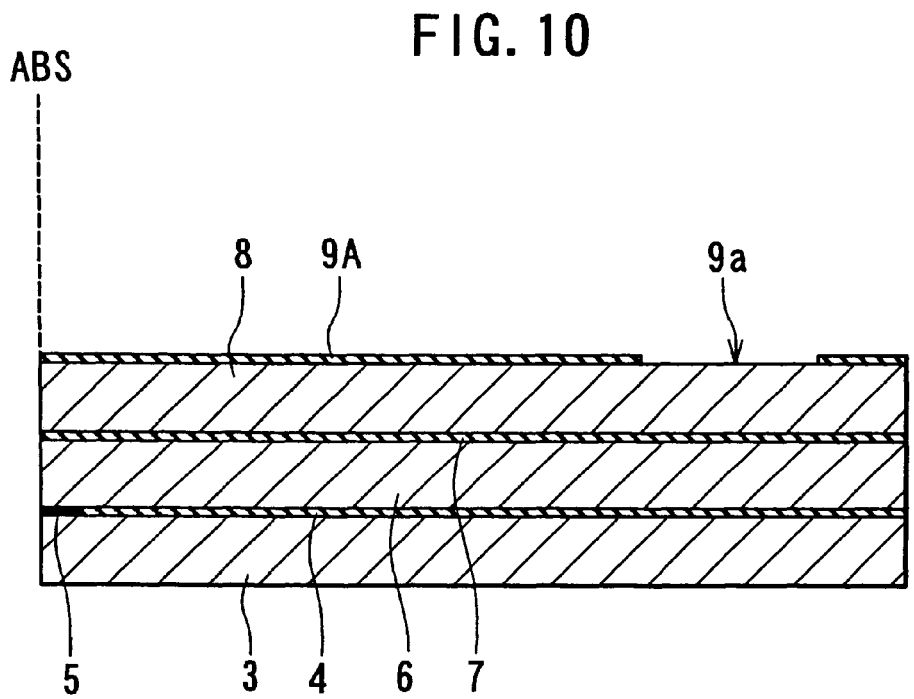
FIG. 11 is a cross-sectional view illustrating a step that follows FIG. 10.

Then, as shown in FIG. 11, a non-conductive and non-magnetic material such as alumina is sputtered onto the first magnetic layer 8 to form the insulating layer 9A. Subsequently, through the use of a known photolithography technique and dry etching, the contact hole 9a is formed in the insulating layer 9A where the coupling portion 12 is to be formed.

Figure 12:
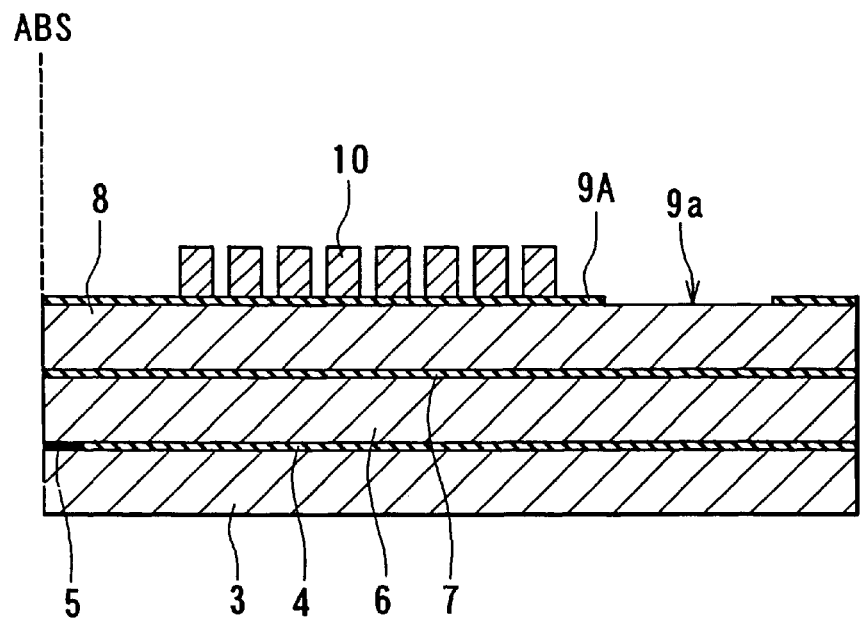
FIG. 12 is a cross-sectional view illustrating a step that follows FIG. 11.

Then, as shown in FIG. 12, the thin-film coil 10 is formed on the insulating layer 9A with a known photolithography technique and a known deposition technique (e.g., electroplating).

Figure 13:
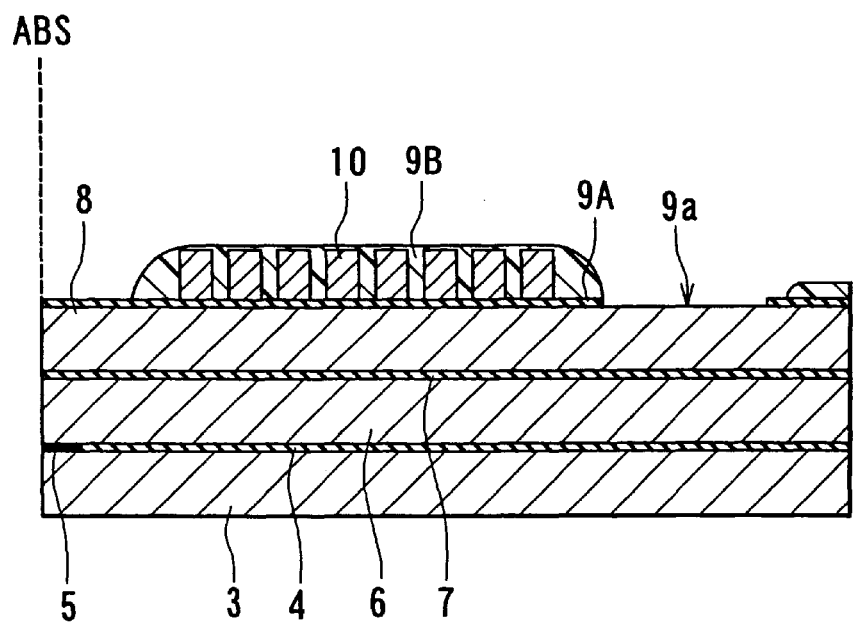
FIG. 13 is a cross-sectional view illustrating a step that follows FIG. 12.

Then, as shown in FIG. 13, the insulating layer 9B is formed with a known photolithography technique to fill at least spaces between the windings of the thin-film coil 10.

Figure 14:
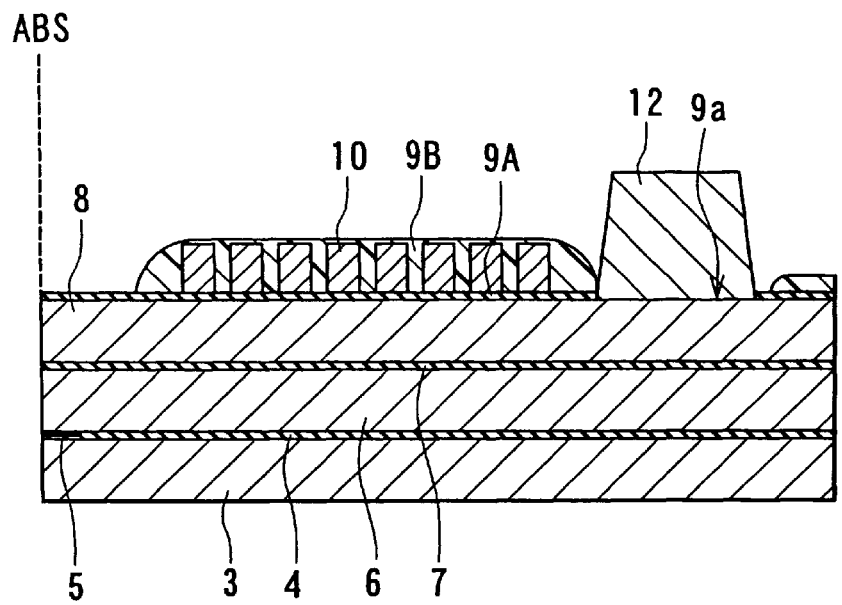
FIG. 14 is a cross-sectional view illustrating a step that follows FIG. 13.

Then, as shown in FIG. 14, with a known photolithography technique and a known deposition technique (e.g., electroplating), the coupling portion 12 is formed on the first magnetic layer 8 where the contact hole 9a is formed. For example, the coupling portion 12 has a thickness of 2 to 4 $\mu$m.

Figure 15:
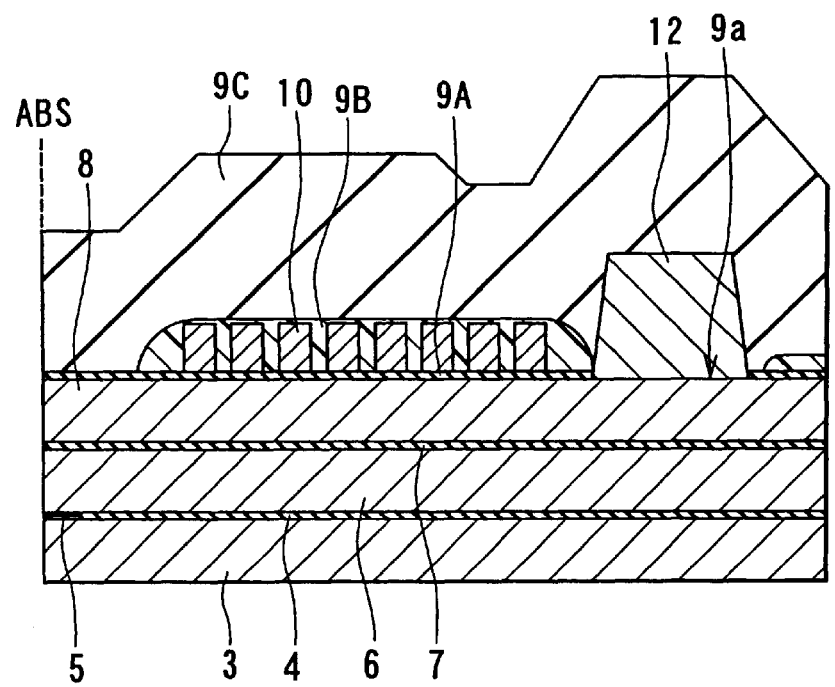
FIG. 15 is a cross-sectional view illustrating a step that follows FIG. 14.

Then, as shown in FIG. 15, the insulating layer 9C is formed by sputtering, so as to cover the thin-film coil 10, the insulating layer 9A, the insulating layer 9B and the coupling portion 12. At this stage, the insulating layer 9C has a thickness equal to or greater than that of the coupling portion 12, that is, for example, 2 to 6 $\mu$m.

Figure 16:
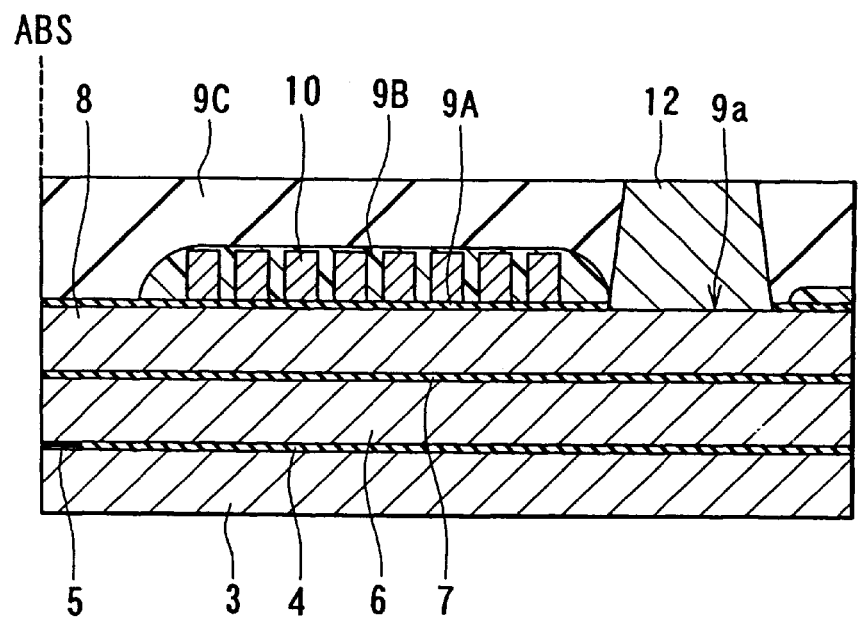
FIG. 16 is a cross-sectional view illustrating a step that follows FIG. 15.

Then, as shown in FIG. 16, the surface of the insulating layer 9C is polished by chemical mechanical polishing, for example, so that the thickness of the insulating layer 9C becomes equal to the predetermined recording gap length. The top surfaces of the insulating layer 9C and the coupling portion 12 are then flattened. At this stage, the distance from the top surface of the first magnetic layer 8 to the top surface of the insulating layer 9C and the coupling portion 12 is 2 to 4 $\mu$m, for example. The coupling portion 12 is not necessarily required to be exposed at this stage, but may be exposed in a later step.

Figure 17:
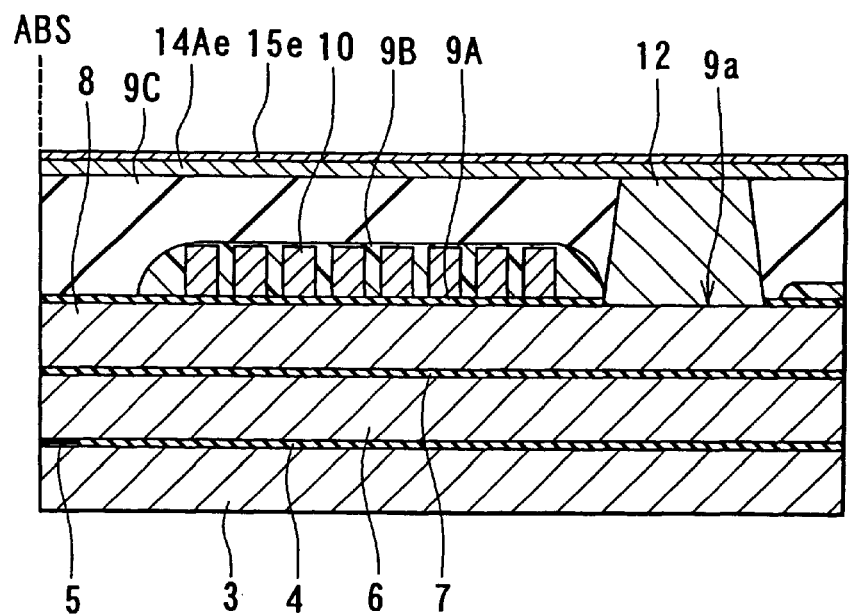
FIG. 17 is a cross-sectional view illustrating a step that follows FIG. 16.

Then, as shown in FIG. 17, on the insulating layer 9C and the coupling portion 12, a layer 14Ae to be etched is formed of a material for forming the pole portion layer 14A of the second magnetic layer 14. The layer 14Ae preferably has a thickness of 0.1 to 0.8 $\mu$m, and more preferably a thickness of 0.3 to 0.8 $\mu$m. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, a non-magnetic layer 15e is formed on the layer 14Ae. The non-magnetic layer 15e is preferably equal to or less than 0.5 $\mu$m in thickness.

Then, although not shown, an electrode layer for electroplating is formed by sputtering on the non-magnetic layer 15e. The electrode layer is equal to or less than 0.1 $\mu$m in thickness and made of an iron-nickel alloy, for example.

Figure 18:
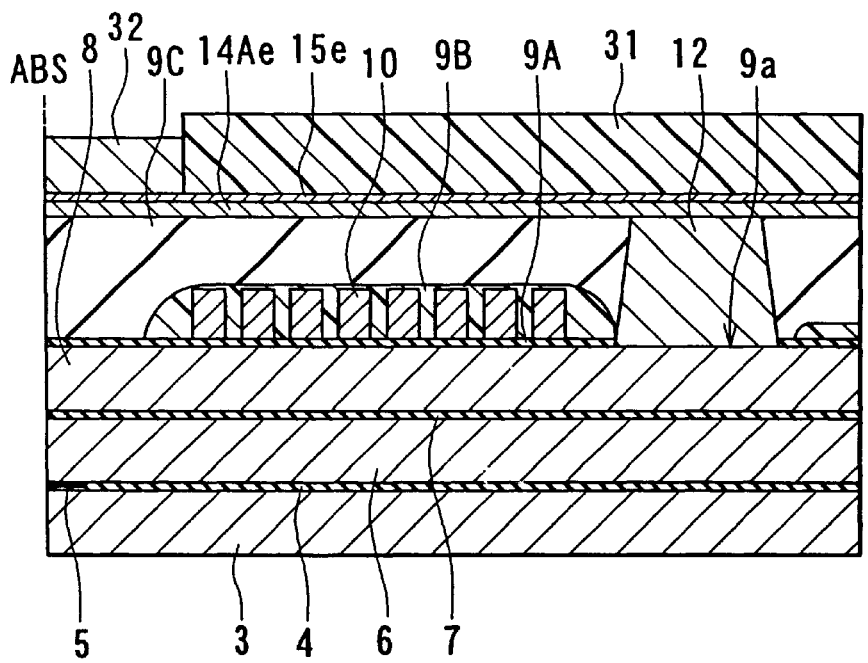
FIG. 18 is a cross-sectional view illustrating a step that follows FIG. 17.

Then, as shown in FIG. 18, a resist frame 31, which has a gap portion corresponding to the shape of the pole portion layer 14A, is formed of a photoresist on the aforementioned electrode layer by photolithography. Using the resist frame 31, a plating film that serves as a mask 32 corresponding to the shape of the pole portion layer 14A is formed on the aforementioned electrode layer by electroplating (frame plating). This plating film is 1 to 4 $\mu$m in thickness and made of an iron-nickel alloy, for example. The resist frame 31 is then removed.

Figure 19:
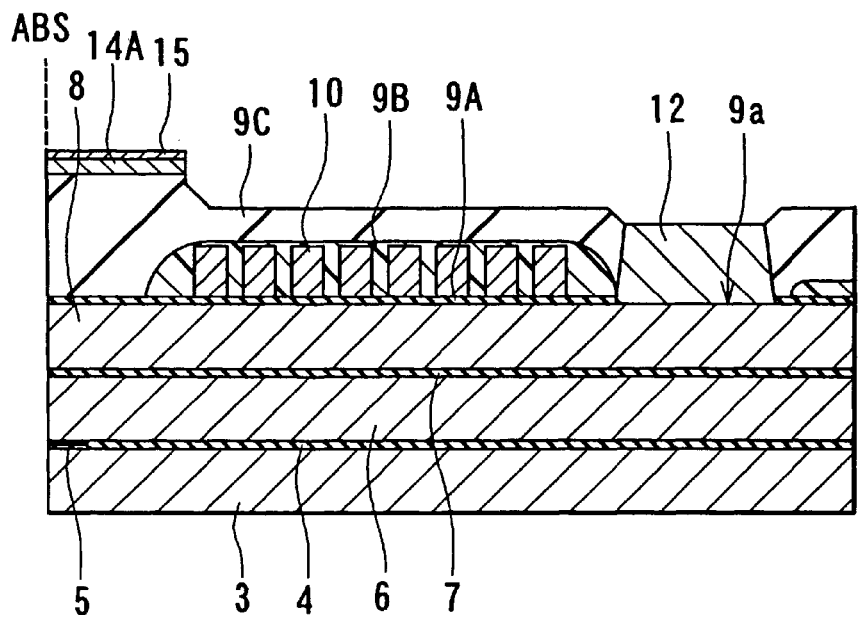
FIG. 19 is a cross-sectional view illustrating a step that follows FIG. 18.

Next, as shown in FIG. 19, using the mask 32, the non-magnetic layer 15e and the layer 14Ae are etched by dry etching such as ion milling to define the outer shapes of the non-magnetic layer 15 and the pole portion layer 14A. At this stage, in the mask 32, at least the portion corresponding to the medium facing surface ABS is preferably removed completely, except in the case where the mask 32 is non-magnetic and sufficiently reliable in terms of resistance to corrosion and the like.

Through the aforementioned etching, the surface of the pole portion layer 14A exposed in the medium facing surface ABS is allowed to have a shape as shown in FIGS. 4 and 5. It may have a shape of a rectangle, or a shape of a trapezoid or a triangle in which the lower side located on the trailing side in the traveling direction T of the recording medium (or on the air-inflow-end side of the slider) is shorter than the upper side. The side surfaces of the pole portion layer 14A may be concave. Also, through the aforementioned etching, the width of the pole portion layer 14 in the medium facing surface ABS may be defined so as to agree with the specification of the track width.

Through the aforementioned etching, the outer shapes of the non-magnetic layer 15 and the pole portion layer 14A are defined and the coupling portion 12 is exposed. In order for the coupling portion 12 to be exposed at this stage, the coupling portion 12 should previously have a greater thickness than desired.

Instead of forming the mask 32 of the plating film as described above, a photoresist may be formed into a patterned resist corresponding to the shape of the pole portion layer 14A on the non-magnetic layer 15e through photolithography. Then, this patterned resist may be used as a mask to etch the non-magnetic layer 15e and the layer 14Ae, so as to define the outer shapes of the non-magnetic layer 15 and the pole portion layer 14A and to expose the coupling portion 12. Thereafter, the patterned resist may be removed.

Figure 20:
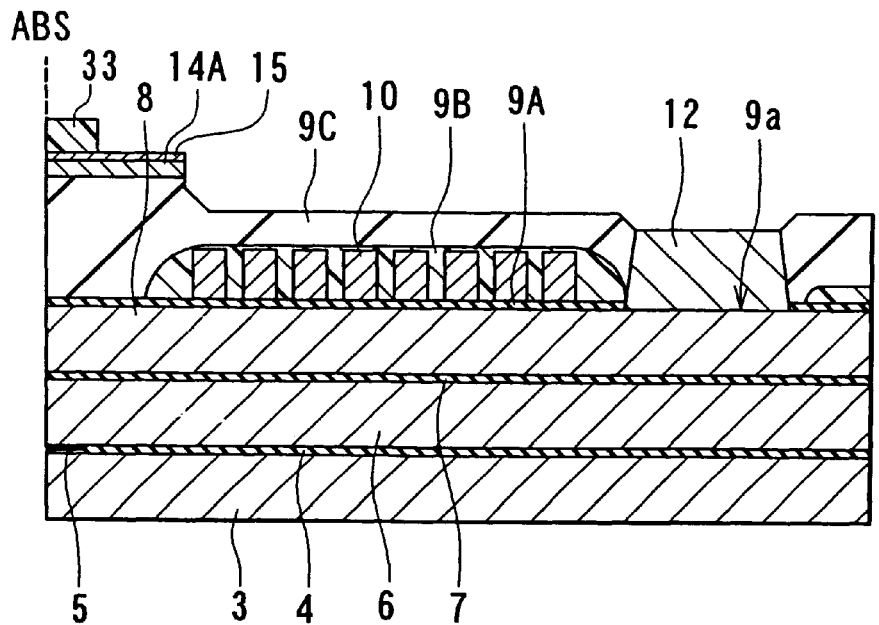
FIG. 20 is a cross-sectional view illustrating a step that follows FIG. 19.

Then, as shown in FIG. 20, a resist cover 33 is formed of a photoresist by photolithography to cover portions of the pole portion layer 14A and non-magnetic layer 15 located near the medium facing surface ABS. The resist cover 33 is preferably formed to have a thickness equal to or less than that of a frame for forming the yoke portion layer to be described later.

Figure 21:
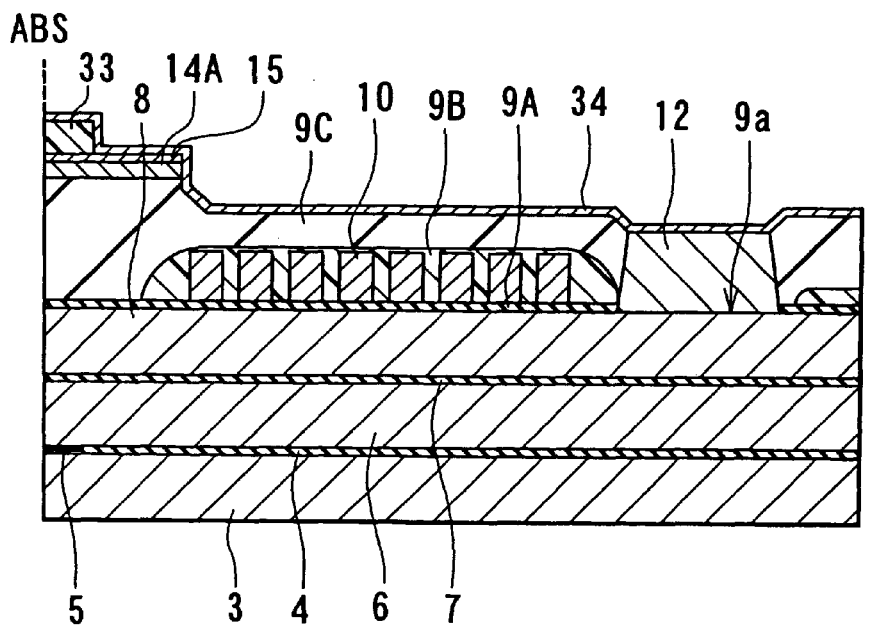
FIG. 21 is a cross-sectional view illustrating a step that follows FIG. 20.

Then, as shown in FIG. 21, an electrode layer 34 for electroplating is formed by sputtering on the resist cover 33, the pole portion layer 14A (and the non-magnetic layer 15), the insulating layer 9C (the gap layer 9), and the coupling portion 12. The electrode layer 34 may have a thickness of 0.1 $\mu$m or less, and may be formed of an iron-nickel alloy, with Ti (titanium) deposited to underlie the electrode layer 34.

Figure 22:
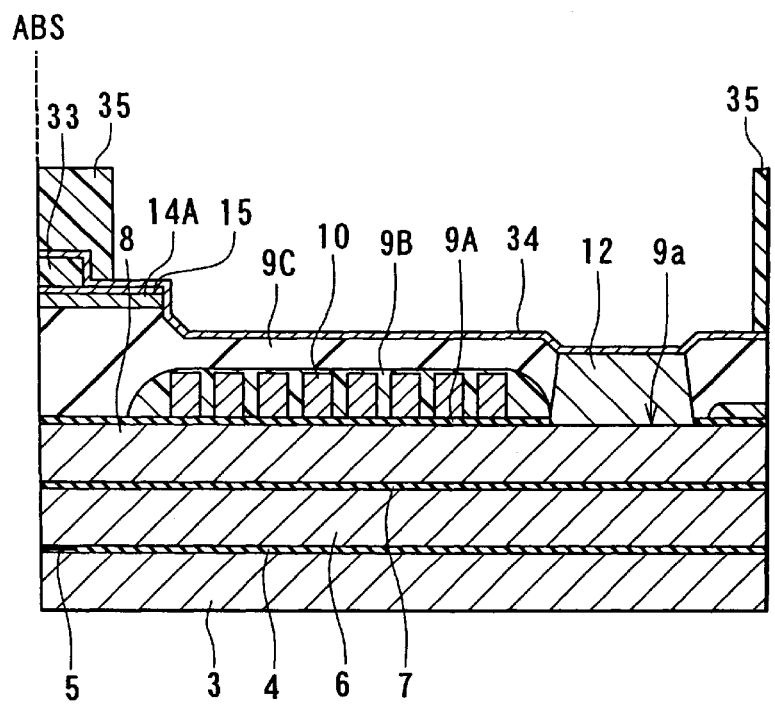
FIG. 22 is a cross-sectional view illustrating a step that follows FIG. 21.

Then, as shown in FIG. 22, a resist frame 35 having a gap portion corresponding to the shape of the yoke portion layer 14B is formed of a photoresist on the electrode layer 34.

Figure 23:
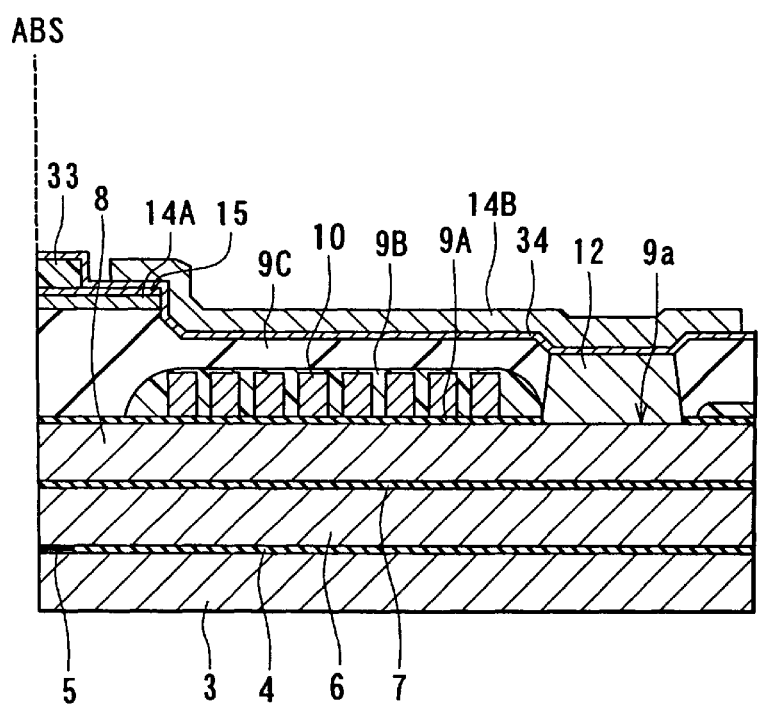
FIG. 23 is a cross-sectional view illustrating a step that follows FIG. 22.

Then, as shown in FIG. 23, using the resist frame 35, the yoke portion layer 14B is formed on the electrode layer 34 by electroplating (frame plating). The resist frame 35 is then removed. Although the yoke portion layer 14B can be formed using the lift-off method, electroplating is most preferably used to allow the shape of the yoke portion layer 14B to follow the shape of the base thereof.

Figure 24:
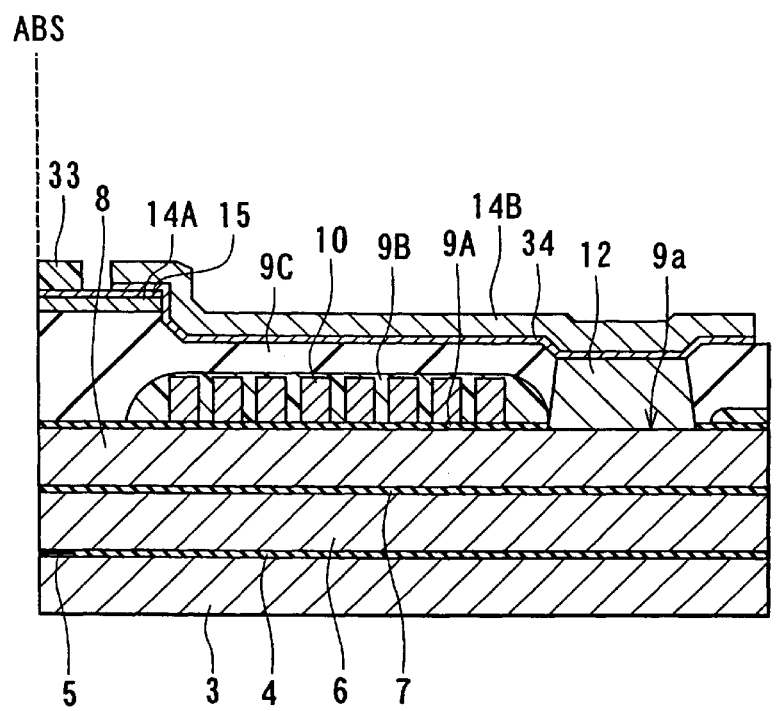
FIG. 24 is a cross-sectional view illustrating a step that follows FIG. 23.

Then, as shown in FIG. 24, the electrode layer 34 except for the portion underlying the yoke portion layer 14B is removed by dry etching.

Figure 25:
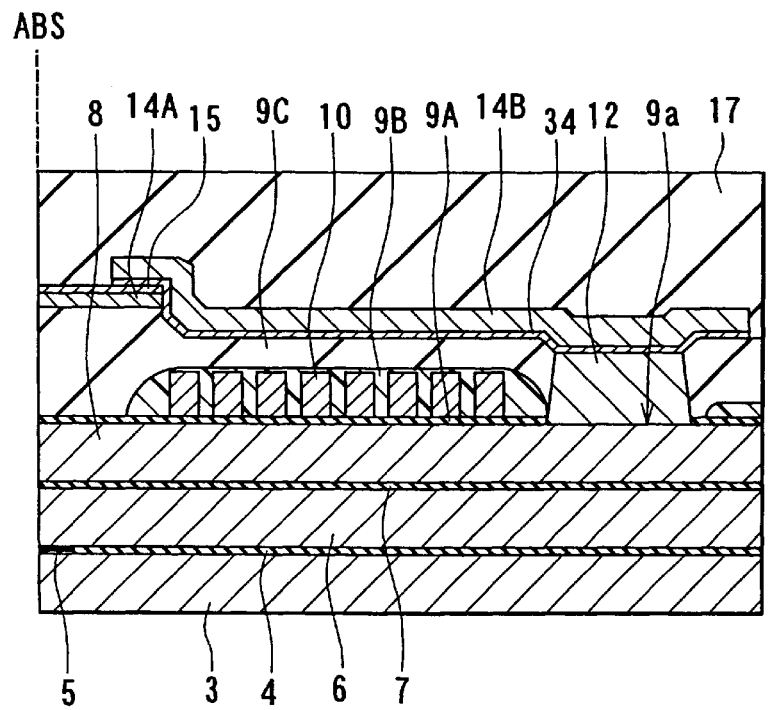
FIG. 25 is a cross-sectional view illustrating a step that follows FIG. 24.

Then, as shown in FIG. 25, the resist cover 33 is removed. Subsequently, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

The method of manufacturing the thin-film magnetic head according to this embodiment can provide the following functions and effects in addition to those provided by the thin-film magnetic head according to this embodiment.

In this embodiment, the step of forming the pole portion layer 14A of the second magnetic layer 14 includes the steps of: forming the layer 14Ae to be etched, made of a material for forming the pole portion layer 14A, on the gap layer 9 and the coupling portion 12; and defining the outer shape of the pole portion layer 14A and exposing the coupling portion 12 by selectively etching the layer 14Ae by dry etching. In this embodiment, the layer 14Ae is etched by dry etching, so as to define the shape of the base of the yoke portion layer 14B such that the base has a gentle slope from the rear end surface of the pole portion layer 14A to the upper end of the coupling portion 12. Accordingly, by forming the yoke portion layer 14B on this base, it is possible to form the magnetic path that connects the coupling portion 12 and the pole portion layer 14A in the shortest distance.

In this embodiment, if the top surface of the layer 14Ae is flattened by polishing after the step of forming the layer 14Ae, the end of the pole portion layer 14A farther from the gap layer 9 can be completely made flat in the medium facing surface ABS. This allows the magnetic field produced from the pole portion layer 14A in the medium facing surface ABS to be made uniform in the direction intersecting the track. Consequently, it is possible to prevent the bit pattern of the recording medium from being distorted, and to thereby improve the linear recording density.

Furthermore, in this embodiment, the top surfaces of the insulating layer 9C to be a base of the layer 14Ae and the coupling portion 12 are flattened before the step of forming the layer 14Ae. This allows the end of the pole portion layer 14A closer to the gap layer 9 to be made flat in the medium facing surface ABS. If the layer 14Ae is formed by sputtering, a good uniformity in thickness of the layer 14Ae as deposited can be obtained, so that the end of the pole portion layer 14A farther from the gap layer 9 can also be made flat in the medium facing surface ABS. As a result, the magnetic field produced from the pole portion layer 14A in the medium facing surface ABS can be made uniform in the direction intersecting the track. Consequently, it is possible to prevent the bit pattern of the recording medium from being distorted, and to thereby improve the linear recording density.

Furthermore, in this embodiment, the step of forming the pole portion layer 14A includes, after the step of forming the layer 14Ae, the steps of: forming the non-magnetic layer 15e on the layer 14Ae; and forming the mask 32 corresponding to the shape of the pole portion layer 14A on the non-magnetic layer 15e. In the step of etching the layer 14Ae, the mask 32 may be used to etch the non-magnetic layer 15e and the layer 14Ae. In this case, it is possible to define the outer shape of the pole portion layer 14A with the top surface of the layer 14Ae being protected by the non-magnetic layer 15e, which makes it possible to maintain the flatness of the end of the pole portion layer 14A farther from the gap layer 9.

Furthermore, in the step of forming the mask 32, the resist frame 31 having a gap portion corresponding to the shape of the pole portion layer 14A may be formed on the non-magnetic layer 15e, so as to form the mask 32 inside the gap portion of the resist frame 31. In this case, it is possible to form the mask 32 to have a better resistance to dry etching compared to the case where the mask 32 is formed using a resist. As a result, even when the pole portion layer 14A is made of a material that has a good resistance to dry etching, it is possible to define the outer shape of the pole portion layer 14A by dry etching using the mask 32.

In the step of forming the yoke portion layer 14B in this embodiment, electroplating may be employed to form the yoke portion layer 14B. In this case, the yoke portion layer 14B can be formed easily into a shape that well follows the shape of the base thereof.

The step of forming the yoke portion layer 14B may include the steps of: forming the resist cover 33 for covering part of the pole portion layer 14A located near the medium facing surface ABS; forming the electrode layer 34 for electroplating on the resist cover 33, the pole portion layer 14A, the gap layer 9 and the coupling portion 12; and forming the yoke portion layer 14B by electroplating using the electrode layer 34. In this case, it is possible to prevent the electrode layer from adhering to and remaining on the side surfaces of part of the pole portion layer 14A located near the medium facing surface ABS, and to thereby prevent the track width from being expanded due to the electrode layer adhering thereto or remaining thereon. It is also possible to prevent degradation in reliability of the thin-film magnetic head caused by the etched material adhering to or remaining on the side surfaces of part of the pole portion layer 14A located near the medium facing surface ABS, when removing the electrode layer by dry etching.

As described above, in the thin-film magnetic head of the invention, the second magnetic layer has the portion layer and the yoke portion layer. The yoke portion layer has a volume sufficiently enough to introduce magnetic flux into the pole portion layer, and the pole portion layer has a saturated magnetic flux density equal to or greater than that of the yoke portion layer. It is therefore possible to prevent saturation of magnetic flux halfway through the second magnetic layer. Furthermore, in the present invention, a surface of the at least part of the thin-film coil, the surface being closer to the second magnetic layer, is located closer to the first magnetic layer than the end of the gap layer located in the medium facing surface next to the second magnetic layer, and than the end of the coupling portion closer to the second magnetic layer. Furthermore, the yoke portion magnetically connects the end of the coupling portion closer to the second magnetic layer and the end surface of the pole portion layer farther from the medium facing surface to each other. Accordingly, the yoke portion layer can form a short magnetic path for establishing a strong magnetic coupling between the coupling portion and the pole portion layer. Consequently, the present invention makes it possible to increase the intensity of the magnetic field generated from the magnetic pole portion in the direction perpendicular to the surface of the recording medium, and to reduce a magnetic path length, thereby improving high-frequency characteristics.

In the thin-film magnetic head of the invention, the first magnetic layer may be disposed on a trailing side in the traveling direction of the recording medium, and the second magnetic layer may be disposed on a leading side in the traveling direction of the recording medium. In this case, it is possible to form a magnetization pattern with an increased density of the recording medium, and as a result, it is possible to increase linear recording density.

In the thin-film magnetic head of the invention, the yoke portion layer may be shaped so as to form a magnetic path inside thereof, the path connecting the end of the coupling portion closer to the second magnetic layer and the end surface of the pole portion layer farther from the medium facing surface in the shortest distance. In this case, it is possible to reduce the magnetic path length and to thereby improve high-frequency characteristics, in particular.

In the thin-film magnetic head of the invention, when the distance between the pole portion layer and the first magnetic layer in the medium facing surface is made equal to or greater than the thickness of the coupling portion, the yoke portion layer may gradually get closer to the first magnetic layer over a region extending from a portion thereof connected to the end surface of the pole portion layer farther from the medium facing surface to a portion thereof connected to the coupling portion. In this case, it is possible to reduce the magnetic path length and to thereby improve high-frequency characteristics, in particular.

In the thin-film magnetic head of the invention, at least part of the yoke portion layer may be formed in a shape of an arc that protrudes towards the first magnetic layer. In this case, part of the yoke portion layer can be closer to the thin-film coil, and therefore the magnetic field generated by the thin-film coil can be absorbed efficiently by the yoke portion layer.

In the thin-film magnetic head of the invention, the yoke portion layer may be magnetically connected to the end surface of the pole portion layer farther from the medium facing surface, and to both side surfaces of the pole portion layer in the width direction. In this case, it is possible to prevent saturation of magnetic flux at the portion where the yoke portion layer and the pole portion layer are connected to each other, and the magnetic flux can be efficiently introduced into the pole portion layer from the yoke portion layer. Consequently, it is possible to increase the intensity of magnetic field applied to the recording medium.

In the thin-film magnetic head of the invention, the end of the yoke portion layer closer to the medium facing surface may be disposed at a distance from the medium facing surface. In this case, it is possible to prevent the magnetic field, generated from the end of the yoke portion layer closer to the medium facing surface, from causing writing of information onto the recording medium.

In the thin-film magnetic head of the invention, a portion of the pole portion layer that touches the yoke portion layer may have a width greater than the width of the pole portion layer measured in the medium facing surface. In this case, it is possible to prevent saturation of magnetic flux at the portion of the pole portion layer touching the yoke portion layer, and to thereby efficiently introduce the magnetic flux from the yoke portion layer into the pole portion layer. In addition, the portion of the pole portion layer exposed in the medium facing surface can be made smaller in area, which makes it possible to increase the intensity of magnetic field applied to the recording medium.

In the thin-film magnetic head of the invention, the end surface of the pole portion layer farther from the medium facing surface may be located at a distance of 2 $\mu$m or more from the medium facing surface. In this case, it is possible to prevent saturation of magnetic flux at the portion of the pole portion layer touching the yoke portion layer, without increasing the thickness or width of the pole portion layer. Consequently, it is possible to introduce the magnetic flux efficiently from the yoke portion layer into the pole portion layer.

The thin-film magnetic head of the invention may further comprise a non-magnetic layer that is in contact with a surface of the pole portion layer that is farther from the gap layer. In this case, it is possible to prevent the surface of the pole portion layer farther from the gap layer from being damaged when forming the pole portion layer by dry etching or when forming the yoke portion layer by electroplating, and to thereby make the surface flat.

In the thin-film magnetic head of the invention, the non-magnetic layer may be exposed in the medium facing surface. In this case, the end of the pole portion layer farther from the gap layer can be kept flat in the medium facing surface. This allows the magnetic field generated from the pole portion layer in the medium facing surface to be made uniform in the direction intersecting the track. Consequently, it is possible to prevent the bit pattern of the recording medium from being distorted in shape, and to thereby improve the linear recording density.

In the thin-film magnetic head of the invention, part of the yoke portion layer may be adjacent to the surface of the pole portion layer farther from the gap layer via the non-magnetic layer, and may be magnetically connected to the pole portion layer via the non-magnetic layer. In this case, it is possible to introduce magnetic flux from the yoke portion layer to the medium-facing-surface side of the pole portion layer via the non-magnetic layer, through the surface of the pole portion layer farther from the gap layer, too.

In the thin-film magnetic head of the invention, the non-magnetic layer may be made of a material having a lower etching rate for dry etching than that of a material of the pole portion layer. In this case, it is possible to prevent the surface of the pole portion layer farther from the gap layer from being damaged when forming the pole portion layer by dry etching.

In the thin-film magnetic head of the invention, the at least part of the thin-film coil may be located closer to the first magnetic layer than a midpoint between the first magnetic layer and the second magnetic layer. In this case, the magnetic field produced by the thin-film coil can be efficiently absorbed by the first magnetic layer.

In the thin-film magnetic head of the invention, the gap layer may comprise: a first portion that is made of a material exhibiting fluidity during its formation and is filled at least in between windings of the at least part of the thin-film coil; and a second portion made of a material having a better resistance to corrosion, rigidity and insulation property than those of the first portion, the second portion covering the at least part of the thin-film coil and the first portion, and touching the first magnetic layer, the second magnetic layer and the coupling portion. In this case, it is possible to completely fill the spaces between the windings of the thin-film coil with a non-magnetic material and to thereby increase the reliability of the gap layer.

The thin-film magnetic head of the invention may further comprise a magnetoresistive element as a read element. In this case, it is possible to improve the read performance as compared with the case where reading is performed by using an induction-type electromagnetic transducer.

The thin-film magnetic head of the invention may be employed for a vertical magnetic recording scheme. In this case, it is possible to make the thin-film magnetic head impervious to heat fluctuations of the recording medium, and to thereby increase the linear recording density.

According to the method of manufacturing a thin-film magnetic head of the invention, the second magnetic layer has the portion layer and the yoke portion layer. The yoke portion layer has a volume sufficiently enough to introduce magnetic flux into the pole portion layer, and the pole portion layer has a saturated magnetic flux density equal to or greater than that of the yoke portion layer. It is therefore possible to prevent saturation of magnetic flux halfway through the second magnetic layer. Furthermore, in the present invention, a surface of the at least part of the thin-film coil, the surface being closer to the second magnetic layer, is located closer to the first magnetic layer than the end of the gap layer located in the medium facing surface next to the second magnetic layer, and than the end of the coupling portion closer to the second magnetic layer. Furthermore, the yoke portion magnetically connects the end of the coupling portion closer to the second magnetic layer and the end surface of the pole portion layer farther from the medium facing surface to each other. Accordingly, the yoke portion layer can form a short magnetic path for establishing a strong magnetic coupling between the coupling portion and the pole portion layer. Consequently, the present invention makes it possible to increase the intensity of the magnetic field generated from the magnetic pole portion in the direction perpendicular to the surface of the recording medium, and to reduce a magnetic path length, thereby improving high-frequency characteristics.

In the method of manufacturing a thin-film magnetic head of the invention, the step of forming the pole portion layer may include the steps of: forming a layer to be etched, made of a material for forming the pole portion layer, on the gap layer and the coupling portion; and etching the layer to be etched selectively through dry etching, thereby defining an outer shape of the pole portion layer and exposing the coupling portion. In this case, it is possible to define the shape of the base of the yoke portion layer such that the base has a gentle slope from the end surface of the pole portion layer father from the medium facing surface to the end of the coupling portion closer to the second magnetic layer. Accordingly, by forming the yoke portion layer on this base, it is possible to form the magnetic path that connects the coupling portion and the pole portion layer in the shortest distance.

In the method of manufacturing a thin-film magnetic head of the invention, after the step of forming the layer to be etched, the top surface of the layer to be etched may be flattened by polishing. In this case, the end of the pole portion layer farther from the gap layer can be completely made flat in the medium facing surface. This allows the magnetic field produced from the pole portion layer in the medium facing surface to be made uniform in the direction intersecting the track. Consequently, it is possible to prevent the bit pattern of the recording medium from being distorted, and to thereby improve the linear recording density.

In the method of manufacturing a thin-film magnetic head of the invention, before the step of forming the layer to be etched, a base of the layer to be etched may be flattened by polishing. In this case, the end of the pole portion layer closer to the gap layer can be made flat in the medium facing surface. In addition, if the layer to be etched is formed by sputtering, the end of the pole portion layer farther from the gap layer can also be made flat in the medium facing surface. As a result, the magnetic field produced from the pole portion layer in the medium facing surface can be made uniform in the direction intersecting the track. Consequently, it is possible to prevent the bit pattern of the recording medium from being distorted, and to thereby improve the linear recording density.

In the method of manufacturing a thin-film magnetic head of the invention, after the step of forming the layer to be etched, the outer shape of the pole portion layer may be defined through the steps of: forming a non-magnetic layer on the layer to be etched; forming a mask corresponding to the shape of the pole portion layer, on the non-magnetic layer; and etching the non-magnetic layer and the layer to be etched, through the use of the mask. In this case, it is possible to define the outer shape of the pole portion layer with the top surface of the layer to be etched being protected by the non-magnetic layer, and it is thereby possible to maintain the flatness of the end of the pole portion layer farther from the gap layer.

In the method of manufacturing a thin-film magnetic head of the invention, in the step of forming the mask, a resist frame having a gap portion corresponding to the shape of the pole portion layer may be formed on the non-magnetic layer, and the mask may be formed inside the gap portion of the resist frame. In this case, it is possible to form the mask to have a good resistance to dry etching. As a result, even when the pole portion layer is made of a material that has a good resistance to dry etching, it is possible to define the outer shape of the pole portion layer by dry etching using the mask.

In the method of manufacturing a thin-film magnetic head of the invention, the yoke portion layer may be formed by electroplating. In this case, the yoke portion layer can be formed easily into a shape that well follows the shape of the base thereof.

In the method of manufacturing a thin-film magnetic head of the invention, the step of forming the yoke portion layer may include the steps of: forming a resist cover for covering a part of the pole portion layer located near the medium facing surface; forming an electrode layer for electroplating on the resist cover, the pole portion layer, the gap layer and the coupling portion; and forming the yoke portion layer by electroplating using the electrode layer. In this case, it is possible to prevent the electrode layer or adherents caused by the etching from remaining on the side surfaces of part of the pole portion layer located near the medium facing surface, and to thereby prevent the track width from being expanded due to the electrode layer remaining thereon. It is also possible to prevent degradation in reliability of the thin-film magnetic head resulting from adherents remaining after the etching.

Obviously many modifications and variations of the present invention are possible in the light of the above teachings. It is therefore to be understood that within the range of equivalency of the appended claims the present invention may be carried out otherwise than as specifically described.

What is claimed is:

1. A thin-film magnetic head comprising:
a medium facing surface that faces toward a recording medium;
a first magnetic layer and a second magnetic layer that include magnetic pole portions disposed so as to oppose to each other with a predetermined spacing interposed therebetween along the traveling direction of the recording medium;

a gap layer made of a non-magnetic material and provided between the first and second magnetic layers;

a coupling portion for magnetically coupling the first magnetic layer and the second magnetic layer to each other at a distance from the medium facing surface; and a thin-film coil at least a part of which is disposed between the first and second magnetic layers and insulated from the first and second magnetic layers, wherein:

a surface of the at least part of the thin-film coil, the surface being closer to the second magnetic layer, is located closer to the first magnetic layer than an end of the gap layer is, the end being located in the medium facing surface next to the second magnetic layer, and than an end of the coupling portion is, the end being closer to the second magnetic layer;

the second magnetic layer has: a pole portion layer including the magnetic pole portion, the width of the pole portion layer measured in the medium facing surface defining a track width; and a yoke portion layer that serves as a yoke portion;

the pole portion layer has a saturated magnetic flux density equal to or greater than that of the yoke portion layer; and the yoke portion magnetically connects the end of the coupling portion closer to the second magnetic layer and an end surface of the pole portion layer, the end surface being farther from the medium facing surface, to each other.

2. A thin-film magnetic head according to claim 1, wherein the first magnetic layer is disposed on a trailing side in the traveling direction of the recording medium, and the second magnetic layer is disposed on a leading side in the traveling direction of the recording medium.

3. A thin-film magnetic head according to claim 1, wherein the yoke portion layer is shaped so as to form a magnetic path inside thereof, the path connecting the end of the coupling portion closer to the second magnetic layer and the end surface of the pole portion layer farther from the medium facing surface in the shortest distance.

4. A thin-film magnetic head according to claim 1, wherein the distance between the pole portion layer and the first magnetic layer in the medium facing surface is equal to or greater than the thickness of the coupling portion.

5. A thin-film magnetic head according to claim 1, wherein the yoke portion layer gradually gets closer to the first magnetic layer over a region extending from a portion thereof connected to the end surface of the pole portion layer farther from the medium facing surface to a portion thereof connected to the coupling portion.

6. A thin-film magnetic head according to claim 1, wherein at least part of the yoke portion layer is formed in a shape of an arc that protrudes towards the first magnetic layer.

7. A thin-film magnetic head according to claim 1, wherein the yoke portion layer is magnetically connected to the end surface of the pole portion layer farther from the medium facing surface, and to both side surfaces of the pole portion layer in the width direction.

8. A thin-film magnetic head according to claim 1, wherein an end of the yoke portion layer, the end being closer to the medium facing surface, is disposed at a distance from the medium facing surface.

9. A thin-film magnetic head according to claim 1, wherein a portion of the pole portion layer that touches the yoke portion layer has a width greater than the width of the pole portion layer measured in the medium facing surface.

10. A thin-film magnetic head according to claim 1, wherein the end surface of the pole portion layer farther from the medium facing surface is located at a distance of 2 $\mu$m or more from the medium facing surface.

11. A thin-film magnetic head according to claim 1, further comprising a non-magnetic layer that is in contact with a surface of the pole portion layer that is farther from the gap layer.

12. A thin-film magnetic head according to claim 11, wherein the non-magnetic layer is exposed in the medium facing surface.

13. A thin-film magnetic head according to claim 11, wherein part of the yoke portion layer is adjacent to the surface of the pole portion layer farther from the gap layer via the non-magnetic layer, and is magnetically connected to the pole portion layer via the non-magnetic layer.

14. A thin-film magnetic head according to claim 11, wherein the non-magnetic layer is made of a material having a lower etching rate for dry etching than that of a material of the pole portion layer.

15. A thin-film magnetic head according to claim 1, wherein the at least part of the thin-film coil is located closer to the first magnetic layer than a midpoint between the first magnetic layer and the second magnetic layer.

16. A thin-film magnetic head according to claim 1, wherein the gap layer comprises: a first portion that is made of a material exhibiting fluidity during its formation and is filled at least in between windings of the at least part of the thin-film coil; and a second portion made of a material having a better resistance to corrosion, rigidity and insulation property than those of the first portion, the second portion covering the at least part of the thin-film coil and the first portion, and touching the first magnetic layer, the second magnetic layer and the coupling portion.

17. A thin-film magnetic head according to claim 16, wherein the first portion is made of an organic, non-conductive and non-magnetic material, or a spin-on-glass film.

18. A thin-film magnetic head according to claim 16, wherein the second portion is made of an inorganic, non-conductive and non-magnetic material.

19. A thin-film magnetic head according to claim 1, further comprising a magnetoresistive element as a read element.

20. A thin-film magnetic head according to claim 19, further comprising a first shield layer and a second shield layer for shielding the magnetoresistive element, the first and second shield layers having portions that are located on a side of the medium facing surface and opposed to each other, the magnetoresistive element being located between these portions.

21. A thin-film magnetic head according to claim 20, wherein the first magnetic layer serves also as the second shield layer.

22. A thin-film magnetic head according to claim 1, being employed for a vertical magnetic recording scheme.

* * * * *